(12) United States Patent
Chao et al.

(10) Patent No.: US 11,754,867 B1
(45) Date of Patent: Sep. 12, 2023

(54) PRIVACY DEVICE AND PRIVACY DISPLAY APPARATUS

(71) Applicant: HannStar Display Corporation, Taipei (TW)

(72) Inventors: Guang-Shiung Chao, Tainan (TW); Hsuan-Chen Liu, Kaohsiung (TW); Ling-Chih Kao, New Taipei (TW)

(73) Assignee: HannStar Display Corporation, Taipei (TW)

( * ) Notice: Subject to any disclaimer, the term of this patent is extended or adjusted under 35 U.S.C. 154(b) by 0 days.

(21) Appl. No.: 18/171,663

(22) Filed: Feb. 21, 2023

(30) Foreign Application Priority Data

Mar. 11, 2022 (CN) .......................... 202210237811.8

(51) Int. Cl.
| G02F 1/13 | (2006.01) |
|---|---|
| G02F 1/1343 | (2006.01) |
| G02F 1/1345 | (2006.01) |
| G02F 1/1333 | (2006.01) |
| G02F 1/1339 | (2006.01) |

(52) U.S. Cl.
CPC .......... *G02F 1/1323* (2013.01); *G02F 1/1339* (2013.01); *G02F 1/13452* (2013.01); *G02F 1/133345* (2013.01); *G02F 1/134309* (2013.01)

(58) Field of Classification Search
None
See application file for complete search history.

(56) References Cited

U.S. PATENT DOCUMENTS

| 5,528,319 A | 6/1996 | Austin |
|---|---|---|
| 2018/0052342 A1* | 2/2018 | Chang ............... G02F 1/134363 |
| 2021/0333578 A1 | 10/2021 | Chen et al. |

* cited by examiner

*Primary Examiner* — Phu Vu
(74) *Attorney, Agent, or Firm* — CKC & Partners Co., LLC

(57) ABSTRACT

A privacy device and a privacy display apparatus are provided. The privacy device includes a first substrate, a first privacy electrode, first to fourth pads, a connection electrode, a second substrate, a liquid-crystal layer, a second privacy electrode, and a sealant. The first privacy electrode and the connection electrode are disposed on the first substrate. The first and second pads are coupled to the first privacy electrode. The third and fourth pads are coupled to the connection electrode. The first and second pads are disposed between the third pad and the fourth pad. The liquid-crystal layer and the sealant are disposed between the first substrate and the second substrate. The sealant includes multiple conductors. The connection electrode, the sealant, and the second privacy electrode are in a non-display area and overlap with each other along a direction perpendicular to a top surface of the first substrate.

20 Claims, 21 Drawing Sheets

PRIVACY DEVICE AND PRIVACY DISPLAY APPARATUS

RELATED APPLICATIONS

This application claims priority to China Application Serial Number 202210237811.8 filed Mar. 11, 2022, which is herein incorporated by reference.

BACKGROUND

Field of Invention

The present disclosure relates to a privacy display apparatus and a privacy device disposed on a display device.

Description of Related Art

A display is one of the most common electronic devices in modern life, and it is used in various scenarios and situations. In some situations, the display is additionally equipped with a privacy device which is connected to a power supply and a control. With a privacy device activated, a display can limit the viewing angle of the display within a range. Therefore, the proper design of a privacy device for a viewing display is a topic of concern to those skilled in the art.

SUMMARY

Embodiments of the present disclosure provide a privacy device having a display area and a non-display area. The privacy device includes a first substrate, a first privacy electrode, a first pad and a second pad, a first connection electrode, a third pad and a fourth pad, a second substrate, a liquid-crystal layer, a second privacy electrode, and a sealant. The first privacy electrode is disposed on the first substrate. A first portion of the first privacy electrode is in the display area, and a second portion of the first privacy electrode is in the non-display area. The first pad and the second pad are disposed on the first substrate. The first pad and the second pad are in the non-display area and coupled to the first privacy electrode. The first connection electrode is disposed on the first substrate and in the non-display area. The first connection electrode is electrically insulated from the first privacy electrode. The third pad and the fourth pad are disposed on the first substrate. The third pad and the fourth pad are in the non-display area and coupled to the first connection electrode. The first pad and the second pad are disposed between the third pad and the fourth pad. The liquid-crystal layer is disposed between the first substrate and the second substrate. The second privacy electrode is disposed on a surface of the second substrate facing the liquid-crystal layer. A first portion of the second privacy electrode is in the display area, and a second portion of the second privacy electrode is in the non-display area. The sealant is disposed between the first substrate and the second substrate. The sealant includes multiple conductors. The first connection electrode, the sealant, and the second portion of the second privacy electrode overlap with each other along a direction perpendicular to a top surface of the first substrate.

In some embodiments, the first connection electrode is overlapped with a first portion of the sealant along the direction perpendicular to the top surface of the first substrate. The first portion of the sealant comprises a first portion of the conductors. The first connection electrode is electrically connected to the second privacy electrode through the first portion of the conductors.

In some embodiments, each of the conductors is a conductive particle.

In some embodiments, the first connection electrode is disposed between an edge of the first substrate and the first privacy electrode. The first connection electrode surrounds a portion of a perimeter of the first privacy electrode. Two ends of the first connection electrode are coupled to the third pad and the fourth pad respectively.

In some embodiments, the first connection electrode at least surrounds an upper edge, a left edge and a right edge of the first privacy electrode.

In some embodiments, the first connection electrode further surrounds a portion of a bottom edge of the first privacy electrode.

In some embodiments, the third pad, the first pad, the second pad and the fourth pad are sequentially arranged along a direction.

In some embodiments, the second portion of the first privacy electrode includes a first connection portion and a second connection portion that are electrically connected to the first pad and the second pad respectively. The second portion of the second privacy electrode has a first concavity portion and a second concavity portion. The first concavity portion, a third portion of the sealant, and the first connection portion overlap with each other along the direction perpendicular to the top surface of the first substrate. The second concavity portion, a fourth portion of the sealant, and the second connection portion overlap with each other along the direction perpendicular to the top surface of the first substrate.

In some embodiments, the privacy device further includes an insulation layer disposed on the first substrate. The second portion of the first privacy electrode, the insulation layer, the sealant, and the second portion of the second privacy electrode overlap with each other along the direction perpendicular to the top surface of the first substrate.

In some embodiments, the insulation layer comprises a first insulation block and a second insulation block. The second portion of the first privacy electrode comprises a first connection portion and a second connection portion that are electrically connected to the first pad and the second pad respectively. The first insulation block is disposed between the first connection portion and a third portion of the sealant along the direction perpendicular to the top surface of the first substrate, and the second insulation block is disposed between the second connection portion and a fourth portion of the sealant along the direction perpendicular to the top surface of the first substrate.

In some embodiments, the privacy device further includes a second connection electrode, a fifth pad, and a sixth pad disposed on the first substrate and in the non-display area. The fifth pad and the sixth pad are coupled to the second connection electrode and located between the first pad and the second pad.

In some embodiments, the second connection electrode, the sealant, and the second portion of the second privacy electrode overlap with each other along the direction perpendicular to the top surface of the first substrate.

In some embodiments, the second connection electrode is overlapped with a second portion of the sealant along the direction perpendicular to the top surface of the first substrate. The second portion of the sealant comprises a second portion of the conductors. The second connection electrode is electrically connected to the second privacy electrode through the second portion of the conductors.

In some embodiments, the second connection electrode is located between an edge of the first substrate and the first privacy electrode. Two ends of the second connection electrode are coupled to the fifth pad and the sixth pad respectively.

In some embodiments, the third pad, the first pad, the fifth pad, the sixth pad, the second pad and the fourth pad are sequentially arranged along a direction.

From another aspect, embodiments of the present disclosure provide a privacy display apparatus having a display area and a non-display area. The privacy display apparatus includes a display panel and the aforementioned privacy device disposed at a side of the display panel.

In some embodiments, the privacy device is disposed at a light-incident side or a light-emitting side of the display panel.

In some embodiments, the privacy display apparatus further includes a circuit board electrically connected to the first pad and the third pad. The circuit board is configured to transmit a first signal and a second signal to the first pad and the third pad respectively.

In some embodiments, the privacy display apparatus further includes another circuit board electrically connected to the second pad and the fourth pad. The another circuit board is configured to transmit the first signal and the second signal to the second pad and the fourth pad respectively.

In some embodiments, the privacy device further includes a second connection electrode, a fifth pad, and a sixth pad disposed on the first substrate and in the non-display area. The fifth pad and the sixth pad are coupled to the second connection electrode and located between the first pad and the second pad. The circuit board is electrically connected to the fifth pad. The circuit board is configured to transmit the second signal to the fifth pad.

BRIEF DESCRIPTION OF THE DRAWINGS

The invention can be more fully understood by reading the following detailed description of the embodiment, with reference made to the accompanying drawings as follows.

DETAILED DESCRIPTION

Specific embodiments of the present invention are further described in detail below with reference to the accompanying drawings, however, the embodiments described are not intended to limit the present invention and it is not intended for the description of operation to limit the order of implementation. Moreover, any device with equivalent functions that is produced from a structure formed by a recombination of elements shall fall within the scope of the present invention. Additionally, the drawings are only illustrative and are not drawn to actual size.

The use of "first", "second", "third", etc. in the specification should be understood for identifying units or data described by the same terminology but are not referred to particular order or sequence. In addition, the term "couple" used in the specification should be understood for electrically connecting two units directly or indirectly. In other words, when "a first object is coupled to a second object" is written in the specification, it means the first object is directly connecting to the second object or another conductive object is disposed between the first object and the second object.

Figure 1:
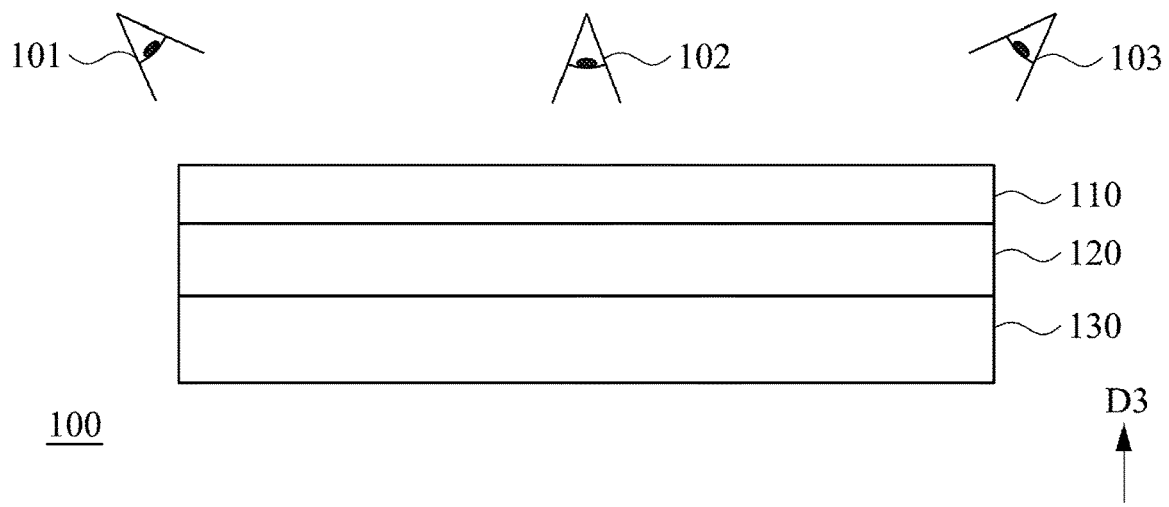
FIG. 1 to FIG. 3 are diagrams illustrating a privacy display apparatus in accordance with some embodiments.

FIG. 1 is a diagram illustrating a privacy display apparatus in accordance with an embodiment. Referring to FIG. 1, a privacy display apparatus 100 (also referred to as a display apparatus with a function of viewing angle adjustment) includes a privacy device 110 (also referred to a viewing angle adjustment device), a display panel 120 and a backlight module 130. The structure of the privacy device 110 will be described in detail below. In the embodiment of FIG. 1, the display panel 120 is a non-self-illuminating display panel. The backlight module 130 includes one or multiple light-emitting units such as light-emitting diodes or lamp tubes. The backlight module 130 can be, for example, a direct-lit backlight module or an edge-lit backlight module to provide a light source. The display panel 120 may be a liquid-crystal display panel but the disclosure is not limited thereto. In the embodiment, the display panel 120 is disposed between the privacy device 110 and the backlight module 130. A user 102 may, for example, be located at a position facing the display panel 120, and users 101 and 103 may, for example, be located at the left-hand side and the right-hand side of the display panel 120 respectively. When the privacy display apparatus 100 is in a first viewing mode (also referred to a normal mode or a public mode), a privacy function is disabled, and the users 101-103 can clearly see the image shown on the display panel 120. When the privacy function of the privacy device 110 is enabled, and that is to say, the privacy display apparatus 100 enters a second viewing mode (also referred to as a privacy mode), a viewing angle of the privacy display apparatus 100 is reduced. For example, the users 101 and 103 cannot see or cannot clearly see the image shown on the display panel 120, but the user 102 can clearly see the image. Alternatively, it may be configured that one of the users 101 and 103 cannot see or cannot clearly see the image, but the other one of the users 101 and 103 and the user 102 can clearly see the image; or it may be configured that one of the users 101 and 103 and the user 102 cannot see or cannot clearly see the image, but the other one of the users 101 and 103 can clearly see the image. In the embodiment, the viewing angle of the first viewing mode is wider than that of the second viewing mode.

Figure 2:
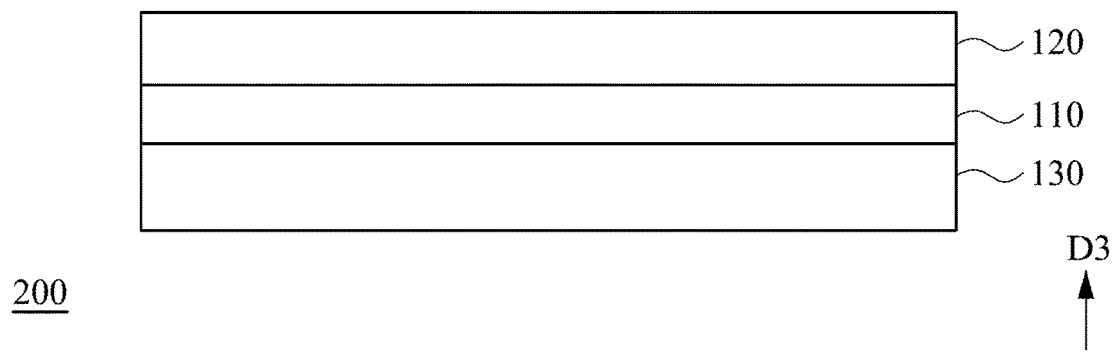

In the embodiment of FIG. 2, a privacy display apparatus 200 also includes the privacy device 110, the display panel 120, and the backlight module 130. The difference from FIG. 1 is that the privacy device 110 is disposed between the display panel 120 and the backlight module 130. In the embodiment, when a user (not shown) watches the images shown on the privacy display apparatus 200, the display panel 120 is located between the user and the privacy device 110.

Figure 3:
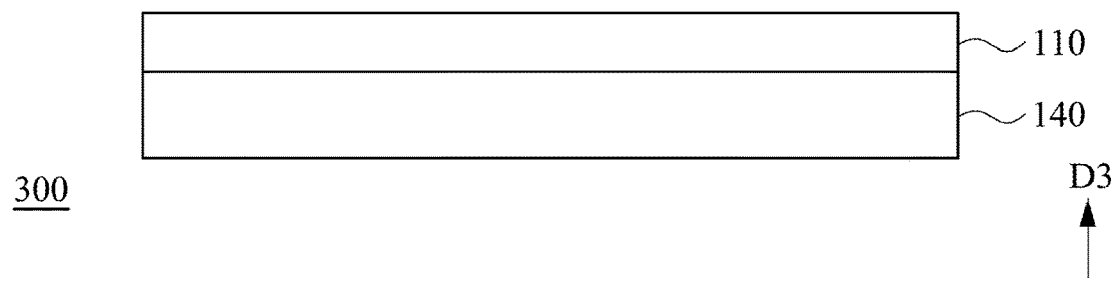

In the embodiment of FIG. 3, a privacy display apparatus 300 includes the privacy device 110 and a display panel 140 which is a self-illuminating display panel such as an Organic Light-Emitting Diodes (OLED) panel or a micro-LED panel without the backlight module. In the embodiment, when a user (not shown) watches the images shown on the privacy display apparatus 300, the privacy device 110 is located between the user and the display panel 140. In the embodiments of FIG. 1 to FIG. 3, each of the display panels 120 and 140 includes multiple pixels which receive image signals to render the images. In the embodiments of FIG. 1 and FIG. 3, the privacy device 110 is at a light-emitting side of the display panels 120 and 140. The light-emitting path of the display panels 120 and 140 is adjusted when the privacy function of the privacy device 110 is enabled so that the user at a particular location cannot see or cannot clearly see the image shown on the display panels 120 and 140. In the embodiment of FIG. 2, the privacy device 110 is at the other side (i.e. a light-incident side) opposite to the light-emitting side of the display panel 120, and the light path from the backlight module 130 to the display panel 120 is adjusted when the privacy function of the privacy device 110 is enabled so that the user at the particular location cannot see or cannot clearly see the image shown on the display panel 120.

First Embodiment

Figure 4:
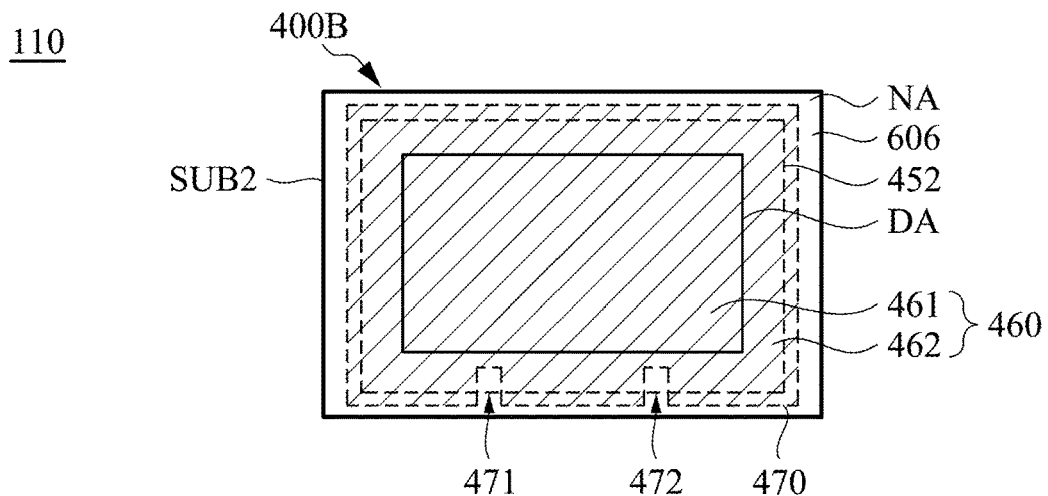
FIG. 4 is a diagram illustrating a top view of the privacy electrode substrate and a sealant in accordance with a first embodiment.
Figure 4:
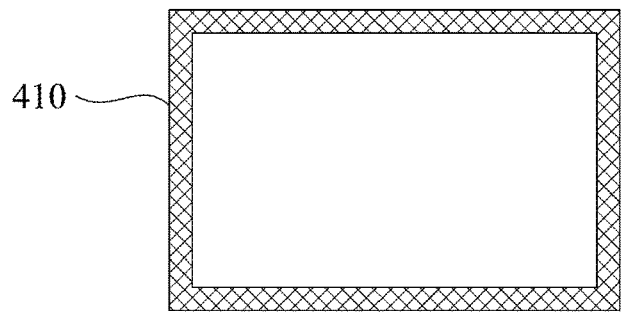
Figure 4:
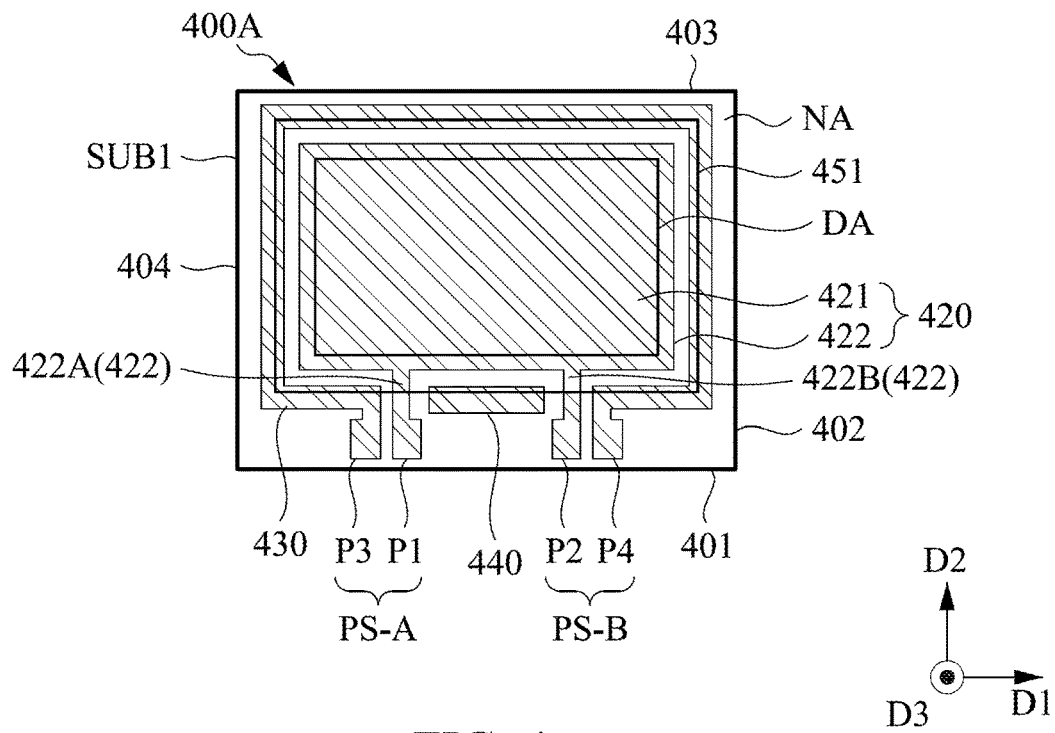
Figure 5:
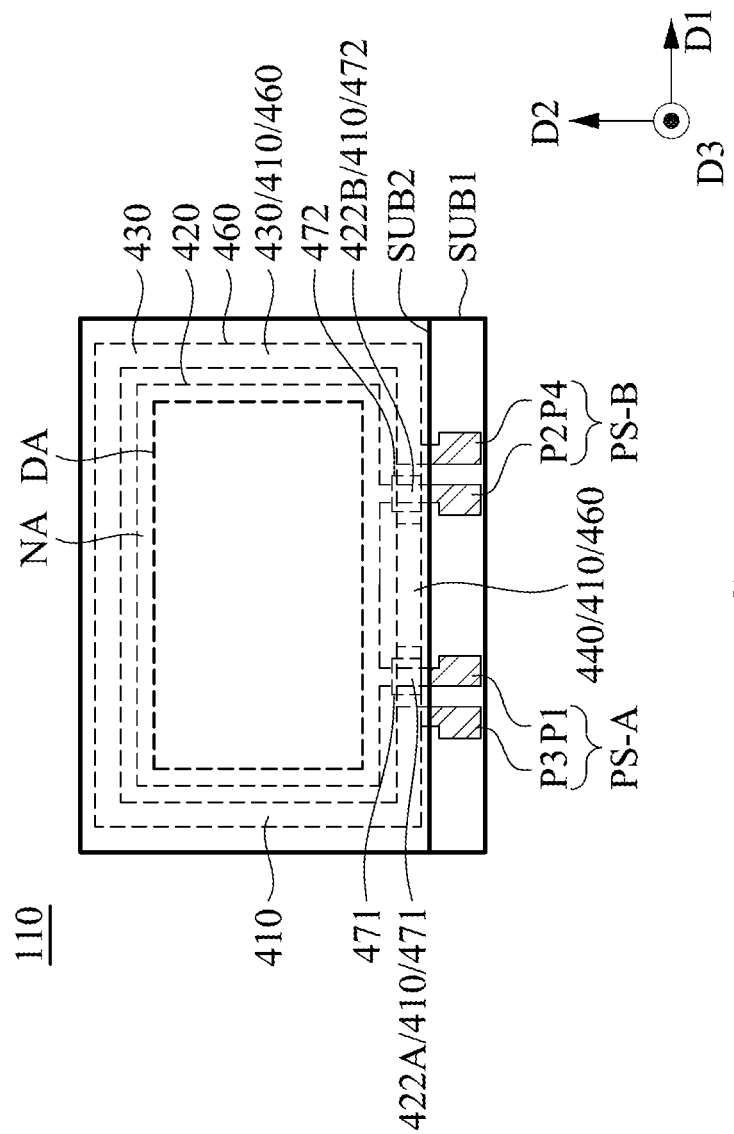
FIG. 5 is a diagram illustrating a top view of a privacy device in accordance with the first embodiment.

FIG. 4 is a diagram illustrating a top view of two privacy electrode substrates and a sealant in accordance with a first embodiment. FIG. 5 is a diagram illustrating a top view of a privacy device after assembling the two privacy electrode substrates of FIG. 4 in accordance with the first embodiment. Referring to FIG. 4 and FIG. 5, the privacy device 110 includes privacy electrode substrates 400A and 400B, and a sealant 410. The top views of the privacy electrode substrates 400A, 400B and a sealant 410 are illustrated in FIG. 4. In FIG. 5, the sealant 410 is disposed between the privacy electrode substrate 400A and privacy electrode substrate 400B in a direction D3. In addition, the privacy device 110 further includes a liquid-crystal layer (not shown) disposed between the privacy electrode substrates 400A and 400B and in a sealed space formed by the privacy electrode substrates 400A, 400B and the sealant 410 to form a liquid-crystal cell. The privacy device 110 includes a display area DA and a non-display area NA. For description, the display area DA and the non-display area NA of the privacy device 110 are also illustrated on the privacy electrode substrates 400A and 400B. When the privacy electrode substrates 400A and 400B are assembled (also referred to as bonded) through the sealant 410, the sealant 410 is disposed in the non-display area NA. The assembly of the privacy electrode substrates 400A and 400B through the sealant 410 means that the liquid-crystal layer is disposed between the privacy electrode substrates 400A and 400B, and the privacy electrode substrates 400A and 400B are bonded through the sealant 410, and therefore the liquid-crystal layer is disposed in the sealed space formed by the privacy electrode substrates 400A, the sealant 410, and the privacy electrode substrate 400B.

As shown in FIG. 4, the privacy electrode substrate 400A includes a substrate SUB1 and a privacy electrode 420, pads P1-P4, a connection electrode 430, a connection electrode 440 and an alignment film 451 that are disposed on the substrate SUB1. The privacy electrode 420 includes a first portion 421 and a second portion 422 in which the first portion 421 is in the display area DA and the second portion 422 is in the non-display area NA. The first portion 421 and the second portion 422 are coupled to each other. To be specific, the first portion 421 of the privacy electrode 420 is located in the whole display area DA. The connection electrode 430 is in the non-display area NA and disposed between each of edges 401-404 of the substrate SUB1 and the privacy electrode 420. In the embodiment, the edges 401-404 of the substrate SUB1 may be respectively referred to as a bottom edge, a right edge, an upper edge and a left edge of the substrate SUB1. The connection electrode 430 surrounds a portion of the perimeter of the privacy electrode 420 and is electrically insulated from the privacy electrode 420. In this embodiment, the connection electrode 430 at least surrounds the upper edge, the left edge, and the right edge of the privacy electrode 420 when viewed in a direction (e.g. the direction D3) perpendicular to a top surface of the substrate SUB1. As shown in FIG. 4, the connection electrode 430 surrounds the upper edge, the left edge, the right edge, and a portion of the bottom edge of the privacy electrode 420. The privacy electrode substrate 400A includes two pad groups PS-A and PS-B. The pad group PS-A includes the pads P1 and P3. The pad group PS-B includes the pads P2 and P4. The pads P1-P4 are all in the non-display area NA. The pad P1 and the pad P2 are coupled to the privacy electrode 420. The pad P3 and the pad P4 are coupled to the connection electrode 430. In the embodiment, the second portion 422 of the privacy electrode 420 includes connection portions 422A and 422B. The pads P1 and P2 are coupled to the connection portions 422A and 422B respectively. One end of the connection electrode 430 is connected to the pad P3, another end of the connection electrode 430 is connected to the pad P4. The pads P3, P1, P2, and P4 are disposed between the bottom edge of the display area DA and the bottom edge 401 of the substrate SUB1 and are sequentially arranged between the left edge 404 and the right edge 402 of the substrate SUB1 when viewed in the direction perpendicular to the top surface of the substrate SUB1. To be specific, the pads P3, P1, P2, and P4 are sequentially arranged along a direction from the left edge 404 of the substrate SUB1 to the right edge 402 of the substrate SUB1 (e.g. a direction D1). Accordingly, the pads P1 and P2 coupled to the privacy electrode 420 are disposed between, along the direction D1, the pads P3 and P4 which are coupled to the connection electrode 430. In other words, the pad of the pad group PS-A that is electrically connected to the privacy electrode 420 and the pad of the pad group PS-A that is electrically connected to the connection electrode 430 are arranged mirror-symmetrically to the pad of the pad group PS-B that is electrically connected to the privacy electrode 420 and the pad of the pad group PS-B that is electrically connected to the connection electrode 430. The advantage of the mirror-symmetrical arrangement will be described in detail in the following description. The connection electrode 440 is disposed between the edge 401 of the substrate SUB1 and the privacy electrode 420 along a direction D2, and between the connection portions 422A and 422B along the direction D1. The connection electrode 440 is electrically insulated from the privacy electrode 420. Although the connection electrode 430 and the connection electrode 440 are separated from the each other on the privacy electrode substrate 400A, the connection electrode 440 can be electrically connected to the connection electrode 430 through conductors of the sealant 410 and the privacy electrode of the privacy electrode substrate 400B, and the description thereof will be provided in the following paragraphs. From another aspect, the connection electrode 430 is disposed surrounding the upper edge, the left edge, and the right edge of the privacy electrode 420, the connection electrode 440 is disposed at the bottom side of the privacy electrode 420, and the connection electrode 440 and the pads P1-P4 are disposed at the same side of the privacy electrode 420. In some embodiments, the privacy electrode substrate 400A may not include the connection electrode 440. In the embodiment, the substrate SUB1 is a transparent substrate, and the privacy electrode 420, the pads P1-P4, and the connection electrodes 430 and 440 may be formed by the same transparent conductive layer, but the disclosure is not limited thereto. For example, the substrate SUB1 may be a glass substrate, the material of the transparent conductive layer may include indium tin oxide (ITO) or indium zinc oxide (IZO), but the materials of the substrate SUB1 and the transparent conductive layer are not limited thereto. In the embodiment, a transparent conductive material layer is formed on the substrate SUB1, and a pattern process (e.g. including lithography and etching steps) is performed on the transparent conductive material layer to form a transparent conductive layer including the privacy electrode 420, the pads P1-P4, and the connection electrodes 430 and 440. However, the process for forming the privacy electrodes 420, the pads P1-P4, and the connection electrodes 430 and 440 are not limited in the disclosure.

The privacy electrode substrate 400B includes a substrate SUB2, and an alignment film 452 and a privacy electrode 460 that are disposed on the substrate SUB2. The privacy electrode substrate 400B may further include a light-shielding layer 606 such as a black matrix layer disposed on the substrate SUB2 and in the non-display area NA. In some embodiments, the light-shielding layer 606 may be disposed in the privacy electrode substrate 400A, or the privacy device 110 may not include the light-shielding layer 606. For simplicity, the alignment films 451 and 452 and the light-shielding layer 606 are omitted in FIG. 5. In some embodiments, the privacy electrode substrate 400B further includes multiple spacers (not shown) disposed on the substrate SUB2. After assembling the privacy electrode substrates 400A and 400B through the sealant 410, the spacers are located between the privacy electrode substrates 400A and 400B to form a gap between the privacy electrode substrates 400A and 400B. Since the privacy electrode substrates 400A and 400B are opposite to each other in the privacy device 110 of FIG. 5, the liquid-crystal layer (not shown) is disposed between the privacy electrode substrates 400A and 400B in the direction D3. The privacy electrode 420, the pads P1-P4, the connection electrode 430, the connection electrode 440, and the alignment film 451 of the privacy electrode substrate 400A of FIG. 4 are disposed on a surface of the substrate SUB1 facing the liquid-crystal layer. The alignment film 452 and the privacy electrode 460 of the privacy electrode substrate 400B are disposed on a surface of the substrate SUB2 facing the liquid crystal layer. Therefore, the alignment film 452 and the privacy electrode 460 of the privacy electrode substrate 400B of FIG. 4 are illustrated by dashed lines. The privacy electrode 460 includes a first portion 461 and a second portion 462 in which the first portion 461 is in the display area DA, and the second portion 462 is in the non-display area NA. The first portion 461 and the second portion 462 are coupled to each other. To be specific, the first portion 461 of the privacy electrode 460 is disposed in the whole display area DA. In the embodiment, a bottom edge 470 of the second portion 462 has a concavity portion 471 and a concavity portion 472, and each of the concavity portions 471, 472 caves in along the direction (e.g. the direction D2) from the non-display area NA to the display area DA. The concavity portions 471 and 472 are in the non-display area NA. In the privacy device 110, the concavity portion 471 corresponds to the connection portion 422A of the privacy electrode 420, and the concavity portion 472 corresponds to the connection portion 422B of the privacy electrode 420. In detail, after assembling the privacy electrode substrates 400A and 400B through the sealant 410 to form the privacy device 110, the concavity portion 471 is overlapped with the connection portion 422A of the privacy electrode 420 along a direction D3, and the concavity portion 472 is overlapped with the connection portion 422B of the privacy electrode 420 along the direction D3. The direction D3 is perpendicular to the top surface (i.e. the surface facing the liquid-crystal layer) of the substrate SUB1. The reasons for the concavity portions 471 and 472 respectively overlapping the connection portions 422A and 422B of the privacy electrode 420 along the direction D3 will be described in the following paragraphs. In the embodiment, the substrate SUB2 is a transparent substrate, and the privacy electrode 460 is formed by a transparent conductive layer. For example, the substrate SUB2 may be a glass substrate, and the transparent conductive layer may be indium tin oxide (ITO) or indium zinc oxide (IZO), but the materials of the substrate SUB2 and the transparent conductive layer forming the privacy electrode 460 are not limited thereto. In the embodiment, the privacy electrode substrates 400A and 400B are referred to as a first privacy electrode substrate and a second privacy electrode substrate respectively. The substrates SUB1 and SUB2 are referred to as a first substrate and a second substrate respectively. The privacy electrodes 420 and 460 are referred to as a first privacy electrode and a second privacy electrode respectively. The connection electrodes 430 and 440 are referred to as a first connection electrode and a second connection electrode respectively. Furthermore, the pads P1, P2, P3, and P4 are referred to as a first pad, a second pad, a third pad, and a fourth pad respectively, or referred to as the second pad, the first pad, the fourth pad, and the third pad respectively.

The sealant 410 (also referred to as conductive sealant) includes multiple conductors (not shown) which may be conductive particles such as gold (Au) balls, but the type and material of the conductors in the sealant 410 are not limited thereto. After assembling the privacy electrode substrates 400A and 400B through the sealant 410, the conductors in the sealant 410 serve as a conducting path along the direction perpendicular to the top surface of the substrate SUB1 (i.e. the direction D3). As shown in FIG. 5, in the privacy device 110, the sealant 410 is overlapped with the connection electrodes 430 and 440 and the connection portions 422A and 422B of the second portion 422 of the privacy electrode 420 of the privacy electrode substrate 400A. The sealant 410 is also overlapped with the concavity portions 471 and 472 and the second portion 462 of the privacy electrode 460 of the privacy electrode substrate 400B. In the embodiment, four portions of the sealant 410 that are respectively overlapped with the connection electrode 430, the connection electrode 440, the connection portion 422A, and the connection portion 422B of the privacy electrode substrate 400A may be respectively referred to as a first potion, a second portion, a third portion, and a fourth portion of the sealant 410 in which the first to fourth portions of the sealant 410 are not overlapped with each other, and four portions of the conductors of the sealant 410 that are respectively in the first to fourth portions of the sealant 410 may be respectively referred to as a first portion, a second portion, a third portion, and a fourth portion of the conductors of the sealant 410. In addition, the concavity portions 471 and 472 of the privacy electrode 460 of the privacy electrode substrate 400B are overlapped with the third and fourth portions of the sealant 410 respectively. In the privacy device 110, the connection electrode 430 of the privacy electrode substrate 400A, the first portion of the sealant 410, and at least a portion of the second portion 462 of the privacy electrode 460 of the privacy electrode substrate 400B are overlapped with each other along the direction D3. As shown in FIG. 4 and FIG. 5, the connection electrode 430 of the privacy electrode substrate 400A, the first portion of the sealant 410, and a portion of the second portion 462 of the privacy electrode 460 of the privacy electrode substrate 400B are overlapped with each other along the direction D3, as labeled "430/410/460" in FIG. 5. Therefore, the connection electrode 430 of the privacy electrode substrate 400A is electrically connected to the privacy electrode 460 of the privacy electrode substrate 400B through the conductors of the first portion of the sealant 410 (i.e. the first portion of the conductors of the sealant 410). The electrical connection will be described in detail in FIG. 7. In addition, in the privacy device 110, the connection electrode 440 of the privacy electrode substrate 400A, the second portion of the sealant 410, and another portion of the second portion 462 of the privacy electrode 460 are overlapped with each other along the direction D3, as labeled "440/410/460" in FIG. 5. Therefore, the connection electrode 440 of the privacy electrode substrate 400A is electrically connected to the privacy electrode 460 of the privacy electrode substrate 400B through the conductors in the second portion of the sealant 410 (i.e. the second portion of the conductors of the sealant 410). As mentioned above, the privacy electrode 460 of the privacy electrode substrate 400B is electrically connected to the connection electrodes 430 and 440 of the privacy electrode substrate 400A, and thus the connection electrodes 430 and 440 are electrically connected to each other. In the privacy device 110 of the embodiment, although the third portion and the fourth portion of the sealant 410 are respectively overlapped with the connection portions 422A and 422B of the privacy electrode 420 along the direction D3, the concavity portion 471 can prevent the connection portions 422A of the privacy electrode 420 of the privacy electrode substrate 400A from being conducting to the privacy electrode 460 of the privacy electrode substrate 400B through the conductors of the third portion of the sealant 410, the concavity portions 472 can prevent the connection portions 422B of the privacy electrode 420 of the privacy electrode substrate 400A from being conducting to the privacy electrode 460 of the privacy electrode substrate 400B through the conductors of the fourth portions of the sealant 410. Therefore, the concavity portions 471 and 472 can prevent a short circuit between the privacy electrode 420 of the privacy electrode substrate 400A and the privacy electrode 460 of the privacy electrode substrate 400B because the concavity portions 471 and 472 of the privacy electrode 460 of the privacy electrode substrate 400B are overlapped with the third and fourth portions of the sealant 410 respectively and overlapped with the connection portions 422A and 422B of the privacy electrode 420 of the privacy electrode substrate 400A respectively. In other words, the connection portion 422A of the privacy electrode 420, the third portion of the sealant 410, and the concavity portion 471 of the privacy electrode 460 are overlapped each other along the direction D3 as labeled "422A/410/471" in FIG. 5, and the connection portion 422B of the privacy electrode 420, the fourth portion of the sealant 410, and the concavity portion 472 of the privacy electrode 460 are overlapped with each other along the direction D3 as labeled "422B/410/472" in FIG. 5. The details will be provided in FIG. 8. In the embodiment, the concavity portions 471 and 472, and the connection portions 422A and 422B are referred to as a first concavity portion, a second concavity portion, a first connection portion, and a second connection portion respectively, or referred to as the second concavity portion, the first concavity portion, the second connection portion, and the first connection portion respectively.

Figure 6A:
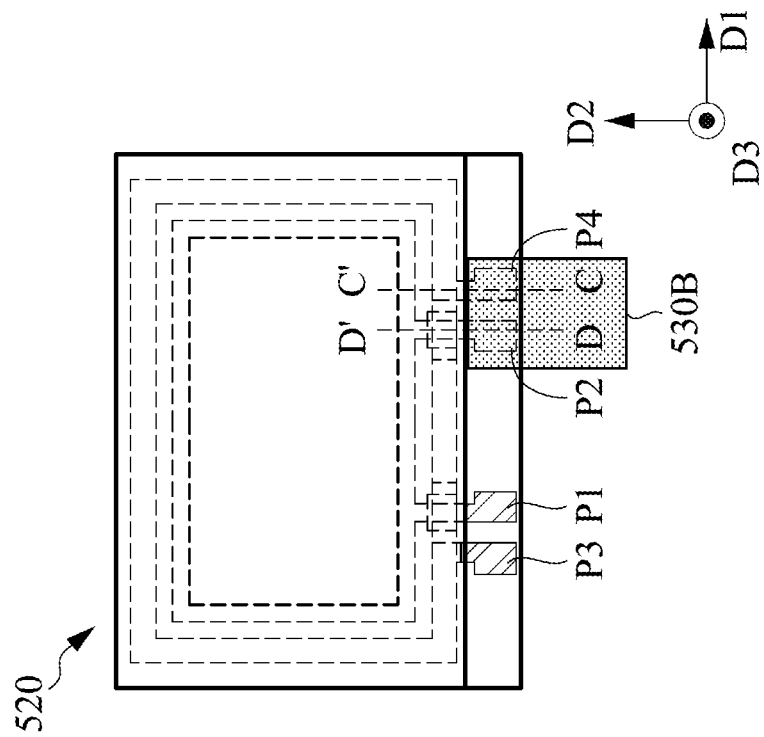
FIG. 6A and FIG. 6B are diagrams illustrating top views of the privacy device of FIG. 5 after it is coupled to a circuit board.
Figure 6B:
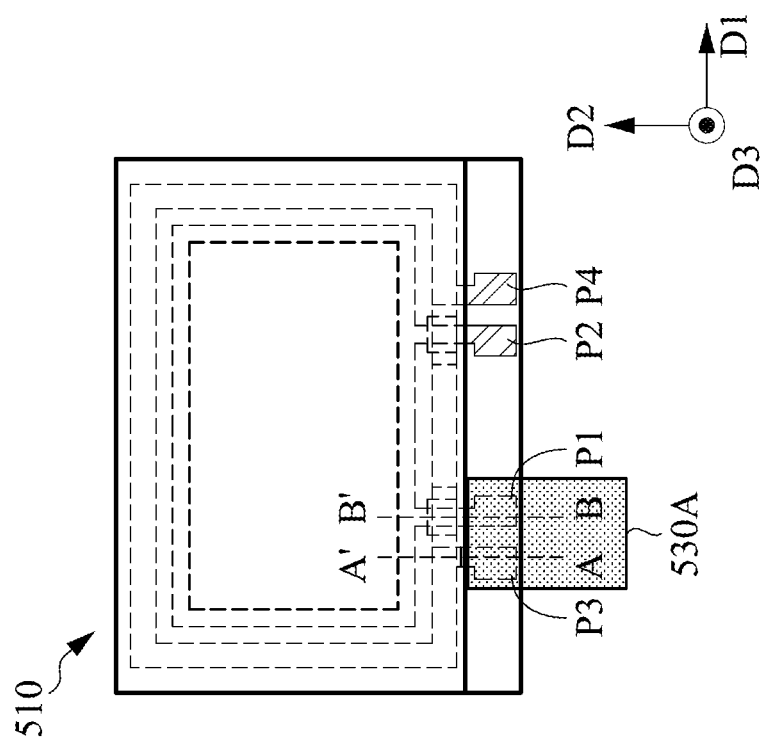
Figure 7:
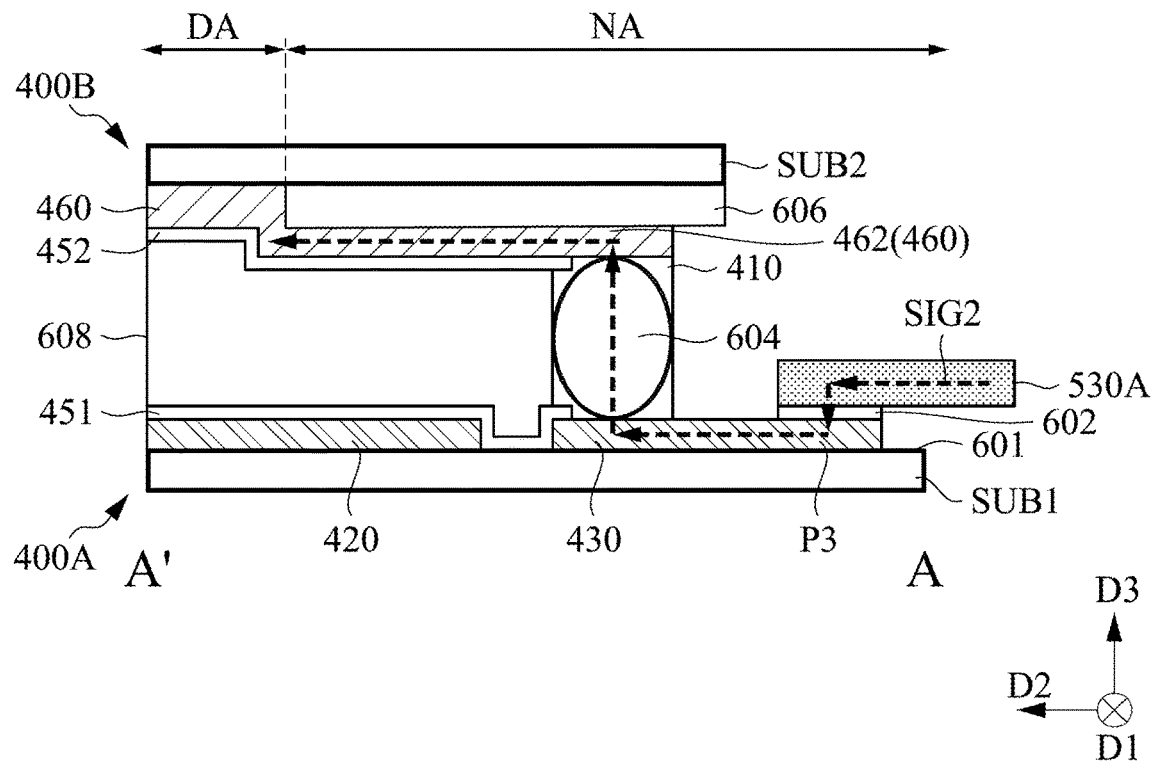
FIG. 7 is a diagram illustrating a cross-sectional view along a cross-sectional line AA' of FIG. 6A.
Figure 8:
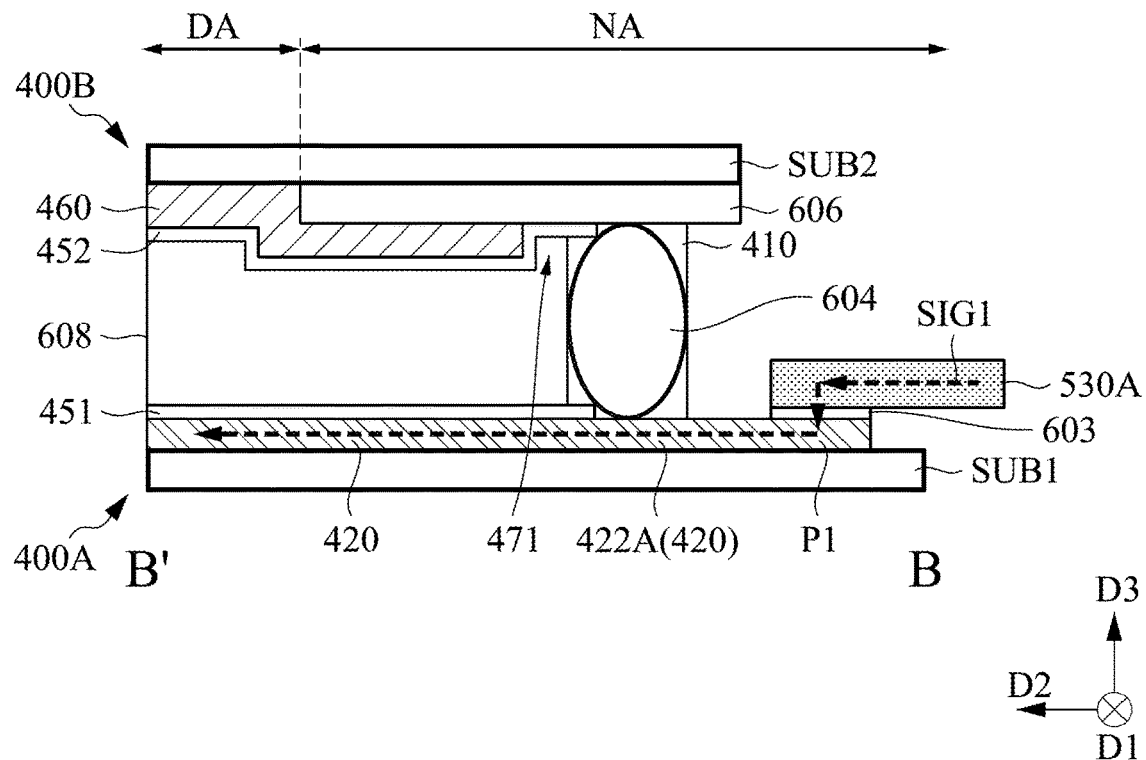
FIG. 8 is a diagram illustrating a cross-sectional view along a cross-sectional line BB' of FIG. 6A.

FIG. 6A is a diagram illustrating a top view of the privacy device of FIG. 5 coupled to a circuit board. FIG. 6B is a diagram illustrating a top view of the privacy device of FIG. 5 coupled to another circuit board. FIG. 7 is a diagram illustrating a cross-sectional view along a cross-sectional line AA' of FIG. 6A. FIG. 8 is a diagram illustrating a cross-sectional view along a cross-sectional line BB' of FIG. 6A. For simplification, symbol references of the display area DA, the non-display area NA, the substrates SUB1, SUB2, the sealant 410, the privacy electrodes 420, 460, the connection portions 422A, 422B, the connection electrodes 430, 440, and the concavity portions 471, 472 are omitted in FIG. 6A and FIG. 6B. Referring to FIGS. 5, 6A, and 6B, since the length of the substrate SUB2 in the direction D2 is shorter than the length of the substrate SUB1 in the direction D2, the pads P1-P4 of the privacy device 110 are not covered by the substrate SUB2 for electrically connecting to a circuit board 530A or a circuit board 530B. In the embodiment, the circuit boards 530A and 530B are flexible circuit boards but the disclosure is not limited thereto. Each of the circuit boards 530A and 530B includes a substrate and multiple connecting lines and pads (not shown in FIG. 6A and FIG. 6B) that are disposed on this substrate, and each pad is electrically connected to the corresponding connecting line. The manufacturer of the privacy display apparatus may connect the circuit board 530A or the circuit board 530B to one of the pad groups PS-A and PS-B according to a practical need. Referring to FIGS. 5, 6A, 7, and 8, in a situation 510, two pads 602 and 603 of the circuit board 530A are electrically connected to the pads P3 and P1 of the pad group PS-A respectively. The circuit board 530 may transmit a first signal SIG1 and a second signal SIG2 to the pads P1 and P3 respectively.

As shown in FIGS. 7 and 8, the privacy electrode 420, the connection electrode 430 and the pads P1 and P3 are disposed on the surface of the substrate SUB1 facing a liquid-crystal layer 608. The alignment film 451 covers the privacy electrode 420. A portion of the connection electrode 430 is covered by the alignment film 451 in FIG. 7, but the disclosure is not limited thereto. In some embodiments, the alignment film 451 does not cover the connection electrode 430. The privacy electrode 460, the alignment film 452, and the light-shielding layer 606 are disposed on the surface of the substrate SUB2 facing the liquid-crystal layer 608. The liquid-crystal layer 608 is disposed between the privacy electrode substrates 400A and 400B. To be specific, at least a portion of the liquid-crystal layer 608 is disposed between the alignment film 451 and the alignment film 452. In FIG. 7 and FIG. 8, a portion of the alignment film 451 is overlapped with the sealant 410 along the direction D3, and a portion of the alignment film 452 is overlapped with the sealant 410 along the direction D3, but the disclosure is not limited thereto. In some embodiments, the alignment films 451 and 452 may not be overlapped with the sealant 410. The light-shielding layer 606 is disposed in the non-display area NA and between the substrate SUB2 and the privacy electrode 460. The dashed lines in FIG. 7 and FIG. 8 respectively represent a path for transmitting the second signal SIG2 from the circuit board 530A to the privacy electrode 460 of the privacy electrode substrate 400B and a path for transmitting the first signal SIG1 from the circuit board 530A to the privacy electrode 420 of the privacy electrode substrate 400A. As shown in FIG. 8, the circuit board 530A transmits the first signal SIG1 to the pad P1, and then to the privacy electrode 420 of the privacy electrode substrate 400A; as shown in FIG. 7, the circuit board 530A transmits the second signal SIG2 to the pad P3, and then to the privacy electrode 460 of the privacy electrode substrate 400B through the connection electrode 430 of the privacy electrode substrate 400A and the conductor 604 of the sealant 410 because the connection electrode 430 of the privacy electrode substrate 400A, a portion of the sealant 410, and a portion of the second portion 462 of the privacy electrode 460 of the privacy electrode substrate 400B are overlapped with each other along the direction D3 (referring to the label "430/410/460" in FIG. 5). As shown in FIG. 7 and FIG. 8, the first and second signals SIG1 and SIG2 are transmitted to the privacy electrode 420 of the privacy electrode substrate 400A and the privacy electrode 460 of the privacy electrode substrate 400B respectively.

In particular, in the embodiment of FIG. 8, a portion of the sealant 410 is overlapped with the connection portion 422A of the privacy electrode 420 and the concavity portion 471 of the privacy electrode 460 along the direction D3 (referring to the label "422A/410/471" in FIG. 5). That is, the portion of the sealant 410 is not overlapped with the privacy electrode 460 along the direction D3, and thus the conductor 604 in the portion of the sealant 410 does not contact the privacy electrode 460. Accordingly, the privacy electrode 420 is not electrically connected to the privacy electrode 460, and the first signal SIG1 will not be transmitted to the privacy electrode 460. The short circuit between the privacy electrodes 420 and 460 is avoided.

When the privacy display apparatus displays an image, the potential difference between the privacy electrode 420 and privacy electrode 460 (i.e. the potential difference between the first signal SIG1 and the second signal SIG2) can control the orientation of the liquid-crystal molecular in the liquid-crystal layer 608 to adjust the viewing angle of the privacy display apparatus. For example, the potential difference between the privacy electrode 420 and the privacy electrode 460 in the first viewing mode is different from that in the second viewing mode.

Referring to FIG. 5 and FIG. 6B, in a situation 520, two pads (not shown) of the circuit board 530B are electrically connected to the pads P2 and P4 of the pad group PS-B. As regards cross-sectional views along a cross-sectional line CC' and DD' of FIG. 6B, the cross-sectional view along the cross-sectional line CC' is obtained by replacing the pad P3 and the circuit board 530A of FIG. 7 with the pad P4 and the circuit board 530B respectively, the cross-sectional view along the cross-sectional line DD' is obtained by replacing the pad P1, the circuit board 530A, the connection portion 422A, and the concavity portion 471 of FIG. 8 with the pad P2, the circuit board 530B, the connection portion 422B, and the concavity portion 472 respectively, and the description of identical parts is not repeated. Similar to FIG. 6A, FIG. 7, and FIG. 8, a portion of the sealant 410 is overlapped with the connection portion 422B of the privacy electrode 420 and the concavity portion 472 of the privacy electrode 460 along the direction D3. In other words, the potion of the sealant 410 is not overlapped with the privacy electrode 460 along the direction D3. Therefore, the conductor 604 in the portion of the sealant 410 does not contact the privacy electrode 460, such that the privacy electrode 420 is not electrically connected to the privacy electrode 460. Accordingly, the first signal SIG1 is not transmitted to the privacy electrode 460 to avoid the short circuit between the privacy electrodes 420 and 460. The circuit board 530B transmits the first signal SIG1 to the pad P2, and then to the privacy electrode 420 of the privacy electrode substrate 400A; and the circuit board 530B transmits the second signal SIG2 to the pad P4, and then to the connection electrode 430 of the privacy electrode substrate 400A, and then upward to the privacy electrode 460 of the privacy electrode substrate 400B through the conductor 604 of the sealant 410. The term "upward" used herein refers to a direction from the connection electrode 430 of the privacy electrode substrate 400A to the privacy electrode 460 of the privacy electrode substrate 400B.

Figure 9A:
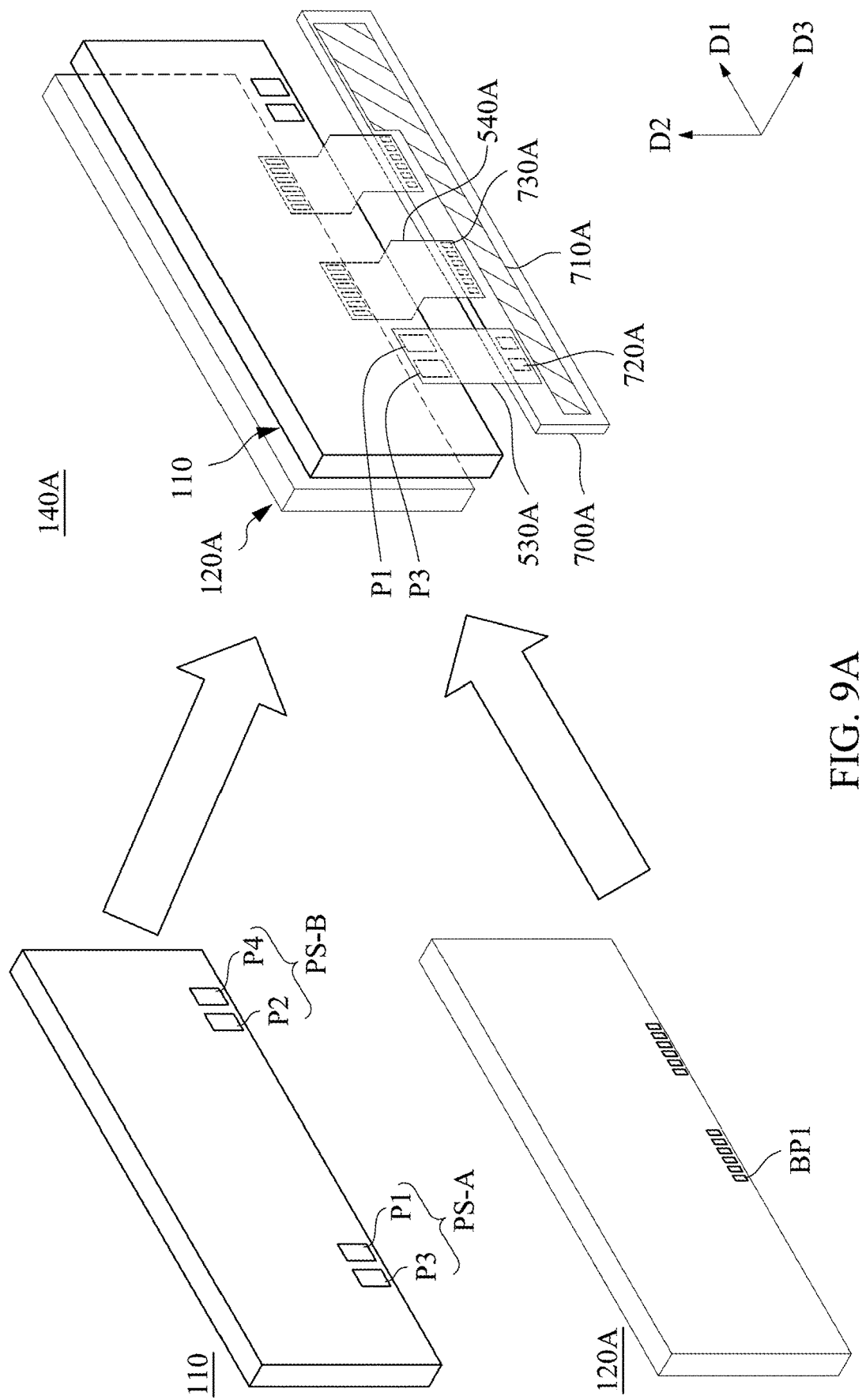
FIG. 9A to FIG. 9C are schematic diagrams illustrating the privacy device, a display panel, a circuit board, and a system board in accordance with some embodiments.
Figure 9B:
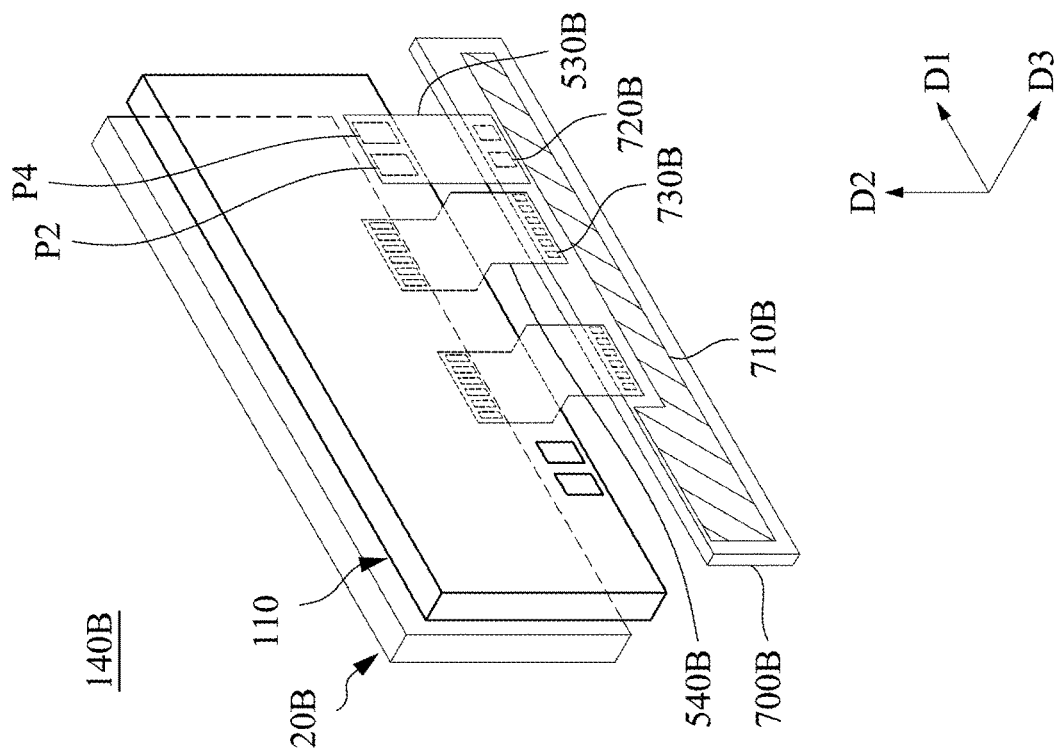
Figure 9B:
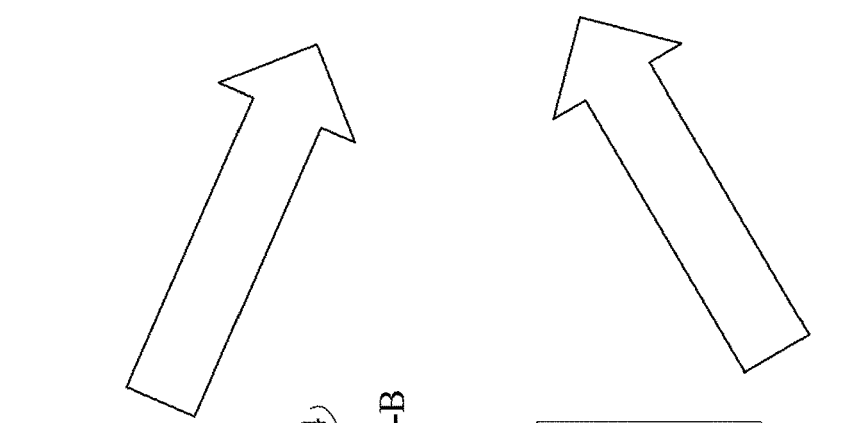

The advantages of the privacy device including two pad groups PS-A and PS-B, and the mirror-symmetrical arrangement of the pads P1, P2 electrically connecting to the privacy electrode 420 of the privacy electrode substrate 400A and the pads P3, P4 electrically connecting the privacy electrode 460 of the privacy electrode substrate 400B will be described in the FIGS. 9A, 9B, 10, 11A, 11B, 12, 13A, and 13B. To be specific, the mirror-symmetrical arrangement indicates that the privacy device (e.g. the privacy device 110) includes a first pad group (e.g. the pad group PS-A) and a second pad group (e.g. the pad group PS-B) along a direction (e.g. the direction D1). Each pad group includes a pad (e.g. the pad P1 or the pad P2) electrically connecting to the privacy electrode of the first privacy electrode substrate (also referred to as a first privacy electrode such as the privacy electrode 420 of the privacy electrode substrate 400A) and a pad (e.g. the pad P3 or the pad P4) electrically connecting to the privacy electrode of the second privacy electrode substrate (also referred to as a second privacy electrode such as the privacy electrode 460 of the privacy electrode substrate 400B). The pad (e.g. pad P3) of the first pad group electrically connecting to the second privacy electrode, the pad (e.g. pad P1) of the first pad group electrically connecting to the first privacy electrode, the pad (e.g. pad P2) of the second pad group electrically connecting to the first privacy electrode, and the pad (e.g. pad P4) of the second pad group electrically connecting to the second privacy electrode are arranged in a sequence along the direction. Therefore, the pads of the first pad group electrically connected to the first privacy electrode and the second privacy electrode respectively are mirror-symmetrical to the pads of the second pad group electrically connected the first privacy electrode and the second privacy electrode respectively. FIG. 9A and FIG. 9B are schematic diagrams illustrating assembling of the privacy device, the display panel, the circuit board, and a system board in accordance with one embodiment and another embodiment. Referring to FIGS. 9A and 9B, the privacy device 110 of the present disclosure may be used in different privacy display apparatuses. For example, the privacy device 110 is provided for different clients such as a client A and a client B. As shown in FIG. 9A, the client A assembles the privacy device 110, the display panel 120A, the circuit boards 530A, 540A and a system board 700A into a privacy display module 140A. The system board 700A includes a circuit region 710A and connection units 720A and 730A. Multiple integrated circuits and routes (not shown) are disposed in the circuit region 710A. The connection units 720A and 730A are coupled to the circuit boards 530A and 540A respectively. The circuit boards 530A and 540A are coupled to the pad group PS-A of the privacy device 110 and multiple pads BP1 of the display panel 120A respectively, such that the system board 700A is electrically connecting to the privacy device 110 and the display panel 120A. For example, the system board 700A transmits the first and second signals (e.g. the first and second signals SIG1, SIG2 in FIGS. 7, 8) to the privacy device 110, and transmits an image signal to the display panel 120A. As shown in FIG. 9B, the client B assembles the privacy device 100, the display panel 120B, the circuit boards 530B, 540B, and a system board 700B into a privacy display module 140B. The system board 700B includes a circuit region 710B and connection units 720B and 730B. Multiple integrated circuits and routes (not shown) are disposed in the circuit region 710B. The connection units 720B and 730B are coupled to the circuit boards 530B and 540B respectively. The circuit boards 530B and 540B are coupled to the pad group PS-B of the privacy device 110 and multiple pads BP2 of the display panel 120B respectively, such that the system board 700B is electrically connecting to the privacy device 110 and the display panel 120B. The circuit boards 530A and 530B are similar to the circuit boards 530A and 530B of FIG. 6A and FIG. 6B respectively. The circuit boards 540A and 540B may be flexible circuit boards, but the disclosure is not limited thereto. For simplification, only pad groups PS-A and PS-B are illustrated in the privacy devices 110 of FIG. 9A and FIG. 9B, and only the pads BP1 and BP2 are illustrated in the display panel 120A of FIG. 9A and the display panel 120B of FIG. 9B respectively. The pads BP1 and BP2 receive the signals for the display panels 120A and 120B. For example, the display panel 120A includes multiple data lines which are coupled to multiple pads BP1 which are electrically connecting to the system board 700A through the circuit board 540A for receiving the image signal. As shown in FIG. 9A, the privacy device 110 is disposed at a light-emitting side of the display panels 120A and 120B, but the disclosure is not limited thereto. In other embodiments, the privacy device 110 may be disposed at a light-incident side of the display panels 120A and 120B. As shown in FIG. 9A and FIG. 9B, different clients may design different circuit arrangements for the system board, and thus the circuit region (e.g. the circuit regions 710A and 710B) of the system board (e.g. the system boards 700A and 700B) may have different arrangements with respect to different clients. If the privacy device includes only one pad group, the manufacturer of the privacy device needs to produce a variety of privacy devices with different locations of the pad group for different clients that intend to cause poor inventory and production efficiency. In the disclosure, the privacy device 110 includes two pad groups (e.g. the pad groups PS-A and PS-B), and each pad group includes a pad (e.g. the pad P1 or the pad P2) electrically connecting to the privacy electrode of the first privacy electrode substrate (e.g. the privacy electrode 420 of the privacy electrode substrate 400A) and a pad (e.g. the pad P3 or the pad P4) electrically connecting to the privacy electrode of the second privacy electrode substrate (e.g. the privacy electrode 460 of the privacy electrode substrate 400B). Accordingly, single one specification of the privacy device 110 is provided for different clients to produce different types of the privacy display apparatus.

Figure 10:
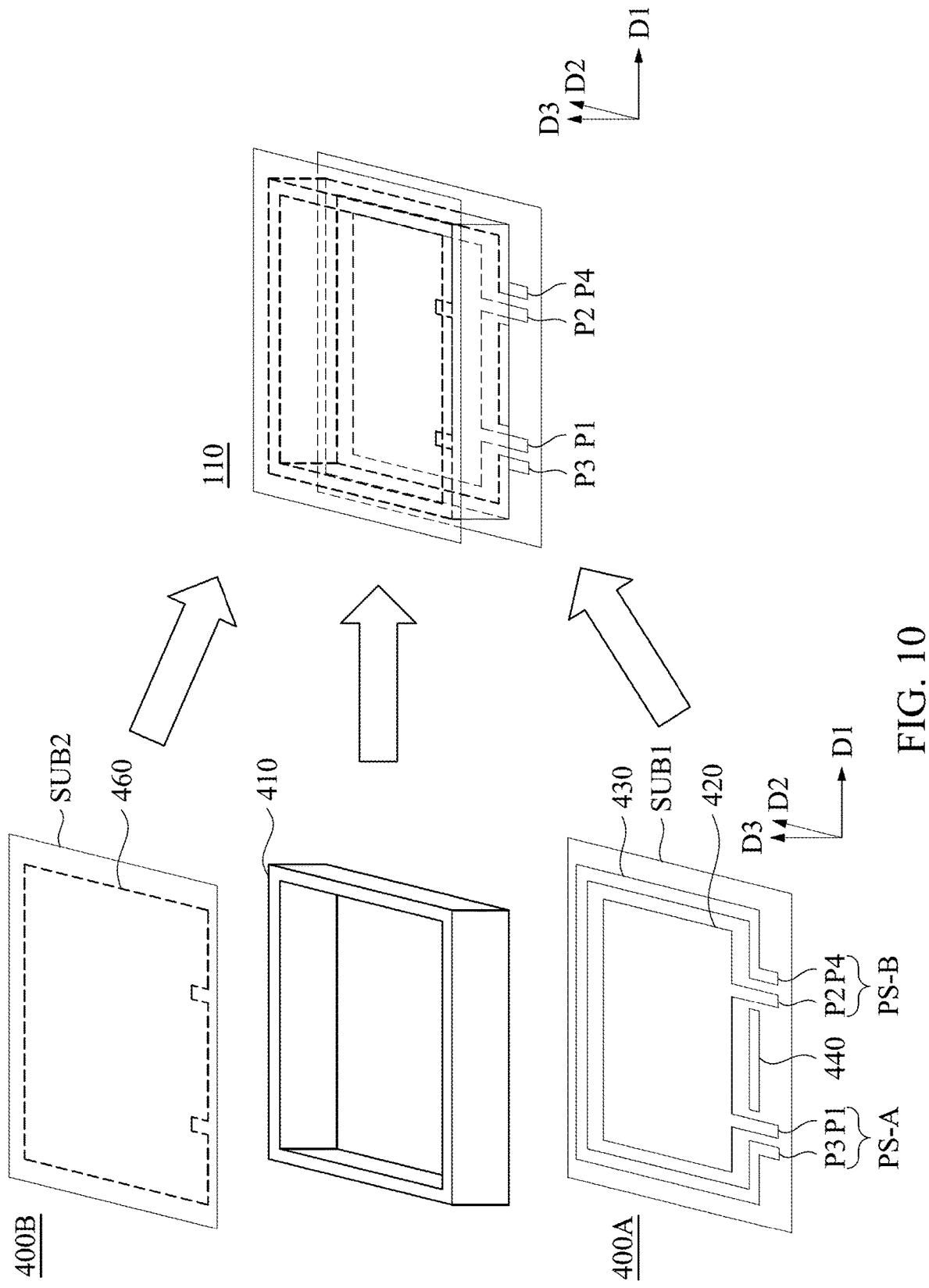
FIG. 10 is a diagram illustrating a perspective view of the privacy electrode substrate, the sealant, and the privacy device in accordance with the first embodiment.
Figure 11A:
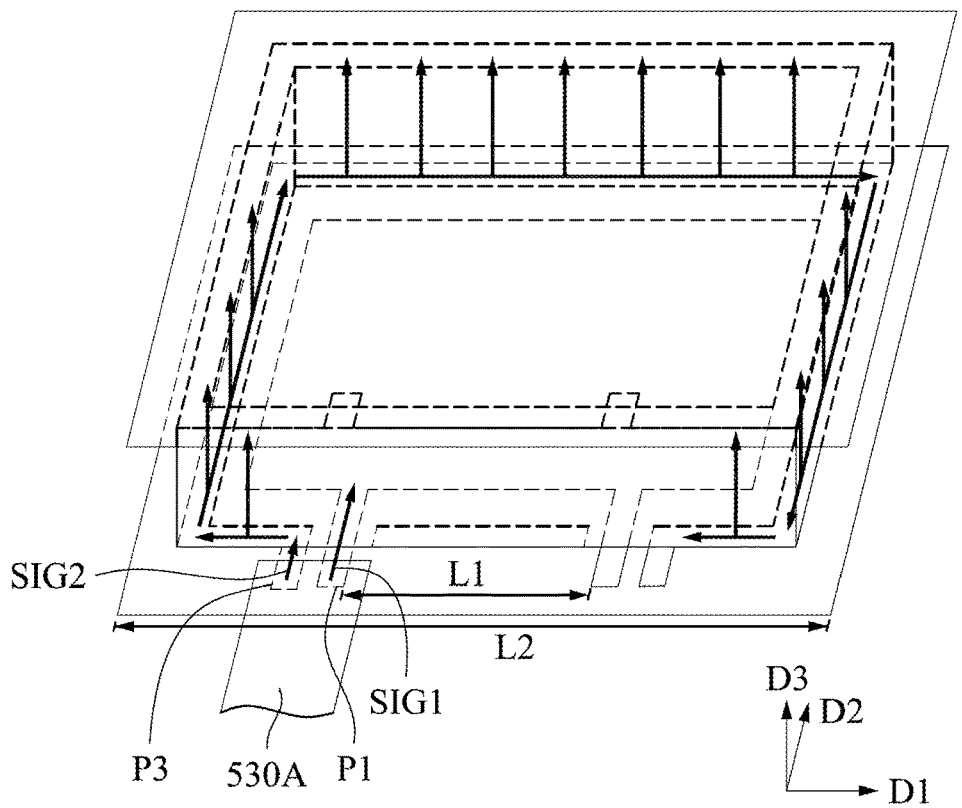
FIG. 11A and FIG. 11B are diagrams illustrating perspective views of the circuit board connecting to the pad group of the privacy device of FIG. 10.
Figure 11B:
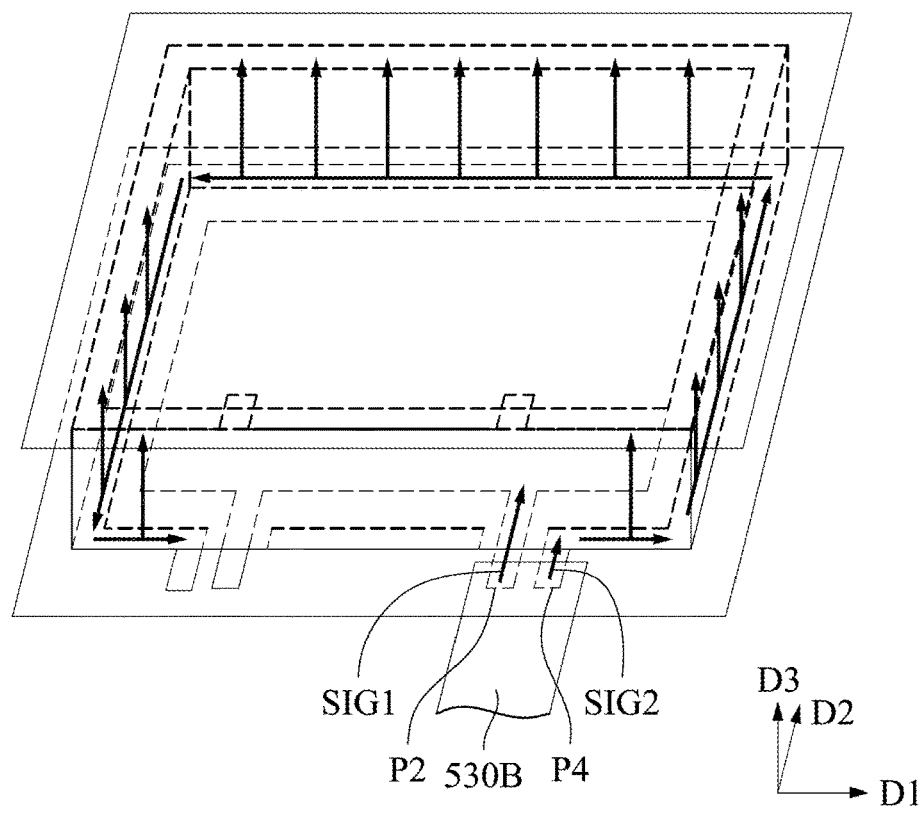

FIG. 10 is a diagram illustrating a perspective view of the two privacy electrode substrates, the sealant, and the assembled privacy device in accordance with the first embodiment. FIG. 11A is a diagram illustrating a perspective view of a circuit board connecting to a pad group of the privacy device of FIG. 10. FIG. 11B is a diagram illustrating a perspective view of another circuit board connecting to another pad group of the privacy device of FIG. 10. Note that for simplification, only the substrate SUB1, the privacy electrode 420, the pads P1-P4, the connection electrode 430, and the connection electrode 440 are illustrated in the privacy electrode substrate 400A, and only the substrate SUB2 and the privacy electrode 460 are illustrated in the privacy electrode substrate 400B in FIGS. 10, 11A, and 11B. The difference between FIG. 11A and FIG. 11B is that the circuit board 530A is coupled to the pad group PS-A in FIG. 11A, and the circuit board 530B is coupled to the pad group PS-B in FIG. 11B. In addition, arrows in FIG. 11A represent a path for the circuit board 530A transmitting the first signal SIG1 to the pad P1 of the pad group PS-A, and then to the privacy electrode 420 of the privacy electrode substrate 400A, and a path for the circuit board 530A transmitting the second signal SIG2 to the pad P3 of the pad group PS-A, and then to the privacy electrode 460 of the privacy electrode substrate 400B through the connection electrode 430 of the privacy electrode substrate 400A and the conductors (not shown) of the sealant 410, and arrows in FIG. 11B represent a path for the circuit board 530B transmitting the first signal SIG1 to the pad P2 of the pad group PS-B, and then to the privacy electrode 420 of the privacy electrode substrate 400A, and a path for the circuit board 530B transmitting the second signal SIG2 to the pad P4 of the pad group PS-B, and then to the privacy electrode 460 of the privacy electrode substrate 400B through the connection electrode 430 of the privacy electrode substrate 400A and the conductors (not shown) of the sealant 410.

Figure 12:
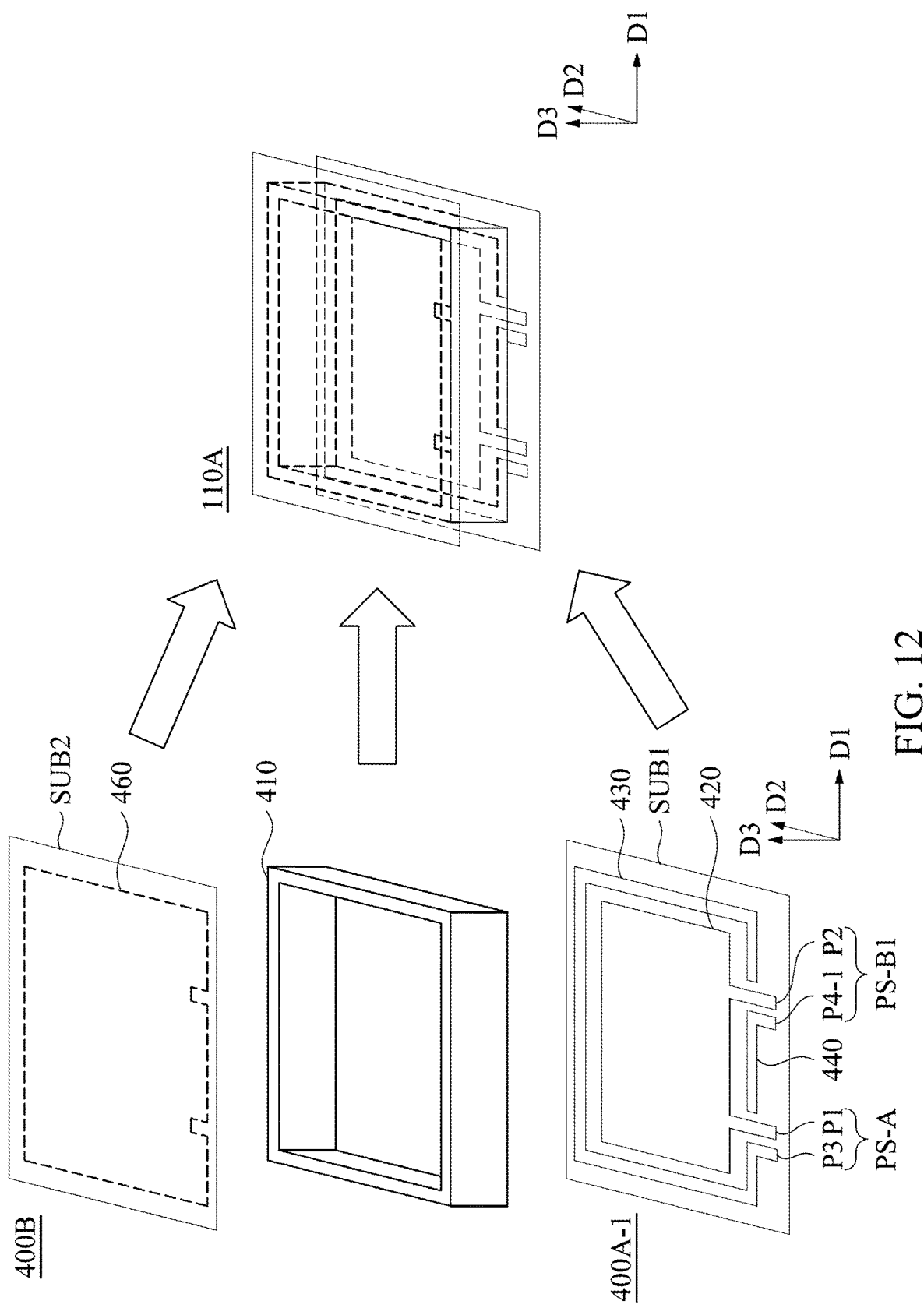
FIG. 12 is a diagram illustrating the privacy electrode substrates, the sealant, and the privacy device in accordance with a comparative embodiment.
Figure 13A:
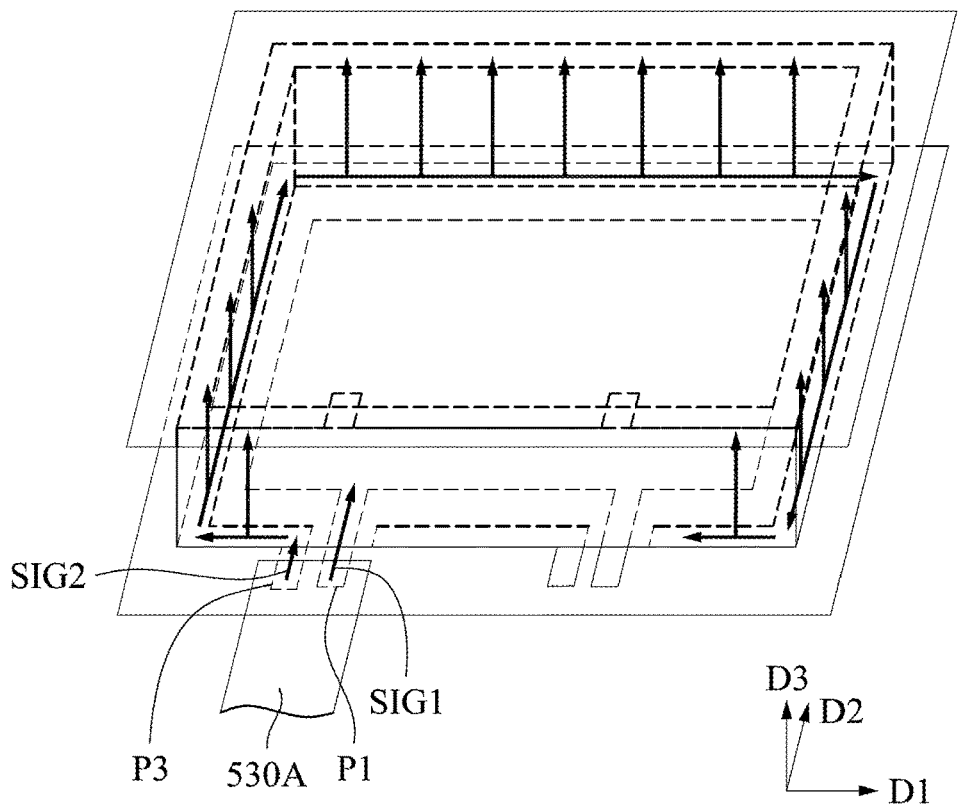
FIG. 13A and FIG. 13B are diagrams illustrating perspective views of the circuit board connecting to the pad group of the privacy device of FIG. 12.
Figure 13B:
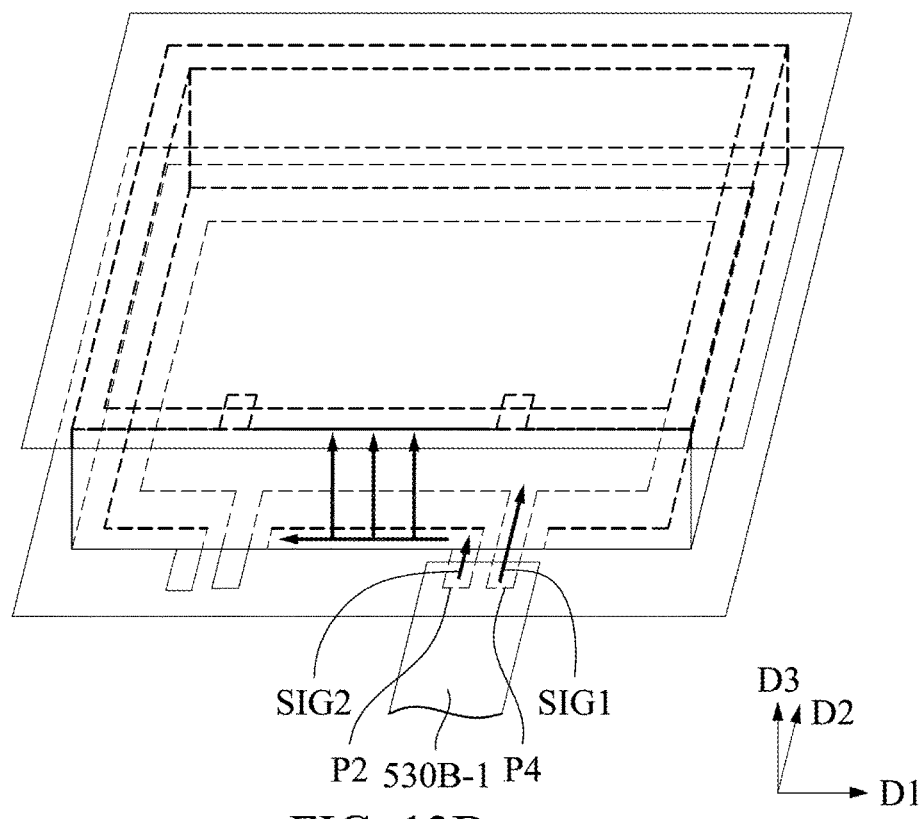

FIG. 12 is a diagram illustrating two privacy electrode substrates, the sealant, and the assembled privacy device in accordance with a comparative embodiment. FIG. 13A is a diagram illustrating a perspective view of the circuit board connecting to the pad group of the privacy device of FIG. 12. FIG. 13B is a diagram illustrating a perspective view of another circuit board connecting to another pad group of the privacy device of FIG. 12. As shown in FIG. 12, the pad group PS-A of the privacy device 110A includes the pads P1 and P3; and the pad group PS-B1 includes pads P2 and P4-1. The pads P1 and P2 are electrically connecting to the privacy electrode 420. The pads P3 and P4-1 are electrically connected to the connection electrodes 430 and 440 respectively. Similar to the description mentioned above, after assembling the privacy electrode substrates 400A-1 and 400B to form the privacy device 110A, the connection electrodes 430 and 440 are electrically connecting to the privacy electrode 460 of the privacy electrode substrate 400B through the conductors (not shown) in the sealant 410. Referring to FIG. 10 and FIG. 12, each of the privacy devices 110 and 110A includes a pad group (e.g. the pad group PS-A) and another pad group (e.g. the pad group PS-B or PS-B1) arranged along the direction D1. Each pad group includes a pad (e.g. the pad P1 or P2) electrically connecting to the privacy electrode of the first privacy electrode substrate (also referred to as a first privacy electrode such as the privacy electrode 420 of the privacy electrode substrate 400A or 400A-1) and a pad (e.g. the pad PS3, PS4, or PS4-1) electrically connecting to the privacy electrode of the second privacy electrode substrate (also referred to as a second privacy electrode such as the privacy electrode 460 of the privacy electrode substrate 400B). In the first embodiment of FIG. 10, the pad P3 of the pad group PS-A electrically connecting to the second privacy electrode 460, the pad P1 of the pad group PS-A electrically connecting to the first privacy electrode 420, the pad P2 of the pad group PS-B electrically connecting to the first privacy electrode, and the pad P4 of the pad group PS-B electrically connecting to the second privacy electrode 460 are sequentially arranged along the direction D1 such that two pads of the pad group PS-A that are respectively electrically connecting to the first and second privacy electrodes 420, 460 are mirror-symmetrical with two pads of the pad group PS-B that are respectively electrically connecting to the first and second privacy electrode 420, 460. In the comparative embodiment of FIG. 12, the pad P3 of the pad group PS-A electrically connecting to the second privacy electrode 460, the pad P1 of the pad group PS-A electrically connecting to the first privacy electrode 420, the pad P4-1 of the pad group PS-B1 electrically connecting to the second privacy electrode 460, and the pad P2 of the pad group PS-B1 electrically connecting to the first privacy electrode 420 are sequentially arranged along the direction D1 such that two pads of the pad group PS-A that are respectively electrically connecting to the first and second privacy electrode 420, 460 are not mirror-symmetrical to two pads of the pad group PS-B that are respectively electrically connecting the first and second privacy electrodes 420, 460. The difference between FIG. 13A and FIG. 13B is that the circuit board 530A is coupled to the pad group PS-A in FIG. 13A, and the circuit board 530B-1 is coupled to the pad group PS-B1 in FIG. 13B. In addition, arrows of FIG. 13A represent a path for the circuit board 530A transmitting the first signal SIG1 to the pad P1 of the pad group PS-A, and then to the privacy electrode 420 of the privacy electrode substrate 400A-1, and a path for the circuit board 530A transmitting the second signal SIG2 to the pad P3 of the pad group PS-A, and then to the privacy electrode 460 of the privacy electrode substrate 400B through the connection electrode 430 and the conductors (not shown) in the sealant 410, and arrows of FIG. 13B represent a path for the circuit board 530B-1 transmitting the first signal SIG1 to the pad P2 of the pad group PS-B1, and then to the privacy electrode 420 of the privacy electrode substrate 400A-1, and a path for the circuit board 530B-1 transmitting the second signal SIG2 to the pad P4-1 of the pad group PS-B1, and then to the privacy electrode 460 of the privacy electrode substrate 400B through the connection electrode 440 and the conductors (not shown) in the sealant 410.

Referring to FIG. 10, FIG. 11A, FIG. 12 and FIG. 13A, when the circuit board 530A is coupled to the pad group PS-A, transmitting paths of the first signal SIG1 and the second SIG2 of FIG. 11A are respectively similar to the transmitting paths of the first signal SIG1 and the second signal SIG2 of FIG. 13A. Referring to FIG. 10, FIG. 11B, FIG. 12 and FIG. 13B, when the circuit board 530B is coupled to the pad group PS-B or the circuit board 530B-1 is coupled to the pad PS-B1, a transmitting path of the first signal SIG1 of FIG. 11B is similar to a transmitting path of the first signal SIG1 of FIG. 13B, while the area of the connection electrode 430 for transmitting the second signal SIG2 upward to the privacy electrode 460 of the privacy electrode substrate 400B in FIG. 11B is greater than the area of the connection electrode 440 for transmitting the second signal SIG2 upward to the privacy electrode 460 of the privacy electrode substrate 400B in FIG. 13B. Therefore, the resistance of the path for transmitting the second signal SIG2 from the pad P4 of the pad group PS-B to the privacy electrode 460 of the privacy electrode substrate 400B in FIG. 11B is much less than the resistance of the path for transmitting the second signal SIG2 from the pad P4-1 of the pad group PS-B1 to the privacy electrode 460 of the privacy electrode substrate 400B in FIG. 13B. In addition, the second signal SIG2 of FIG. 11B is transmitted upward from the connection electrode 430 of the privacy electrode substrate 400A to at least three border regions of the privacy electrode 460 of the privacy electrode substrate 400B through the conductors in the sealant 410, and the second signal SIG2 of FIG. 13B is transmitted upward from the connection electrode 430 of the privacy electrode substrate 400A-1 to a single border region of the privacy electrode 460 of the privacy electrode substrate 400B through the conductors in the sealant 410. Therefore, compared with the embodiment of FIG. 13B, the electric potential uniformity in the privacy electrode 460 of the privacy electrode substrate 400B of FIG. 11B is increased. Based on the description of FIGS. 9A, 9B, 10, 11A, 11B, 12, 13A, and 13B, it should be able to appreciate the advantages of setting two pad groups in which two pads of one pad group that are respectively electrically connecting to the first and second privacy electrode are mirror-symmetrical to two pads of the other pad group that are respectively electrically connecting to the first and second privacy electrode.

Referring to FIGS. 10 and 11A, the distance between the pad groups PS-A and PS-B is equal to L1 (i.e. the distance between the pads P1 and P2). When the distance L1 between the pad groups PS-A and PS-B is reduced, the length of the connection electrode 430 along the direction D1 may be increased, therefore, the second signal SIG2 is transmitted upward from the connection electrode 430 to larger area of the border regions of the privacy electrode 460 of the privacy electrode substrate 400B through the conductors in the sealant 410. Accordingly, the resistance of the path for transmitting the second signal SIG2 from the pad P3 of the pad group PS-A to the privacy electrode 460 of the privacy electrode substrate 400B is further reduced, and the electric potential uniformity in the privacy electrode 460 of the privacy electrode substrate 400B is further increased. In some embodiments, the distance L1 between the pad groups PS-A and PS-B is shorter than or equal to half of the length L2 of the substrate SUB1.

Figure 9C:
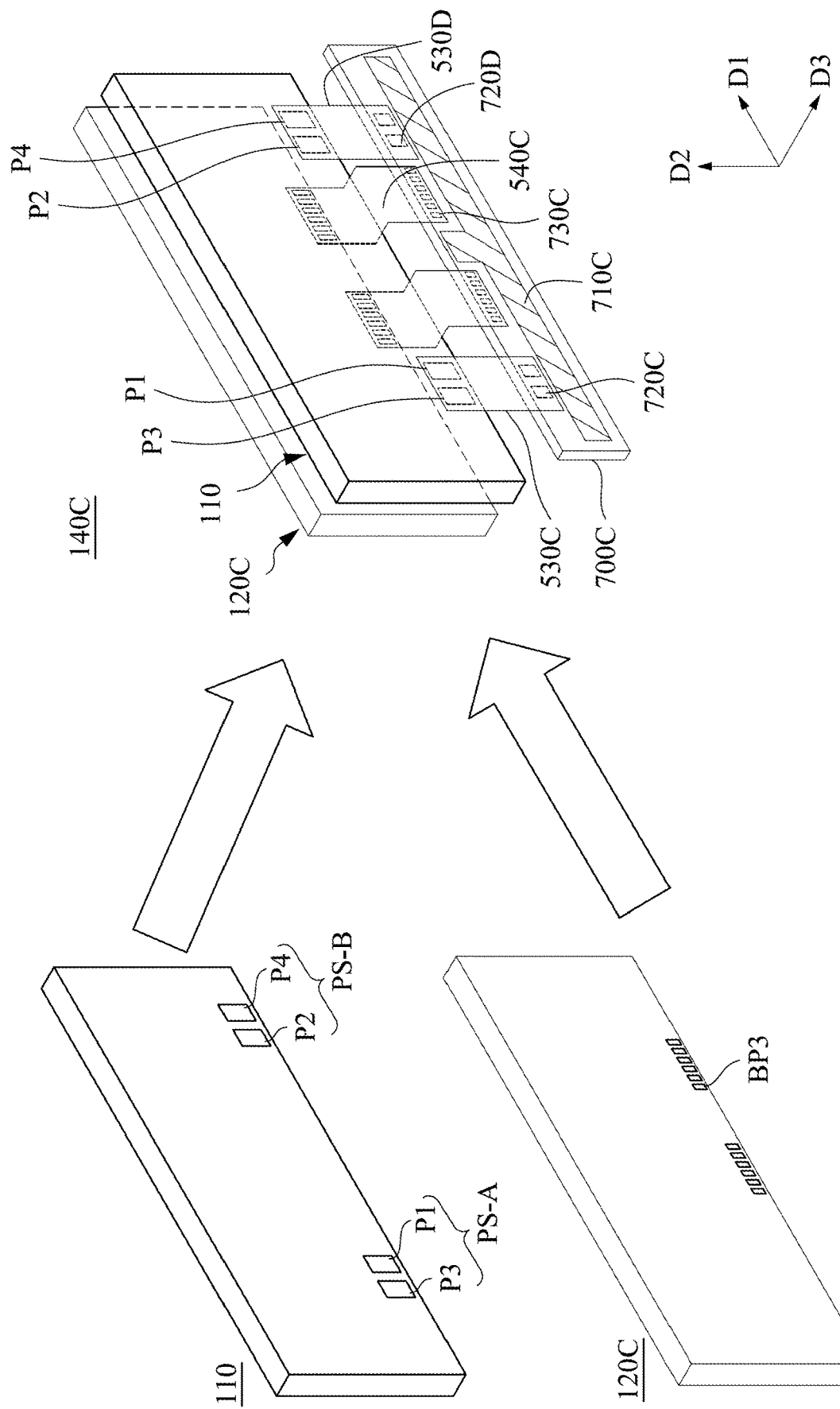
Figure 11C:
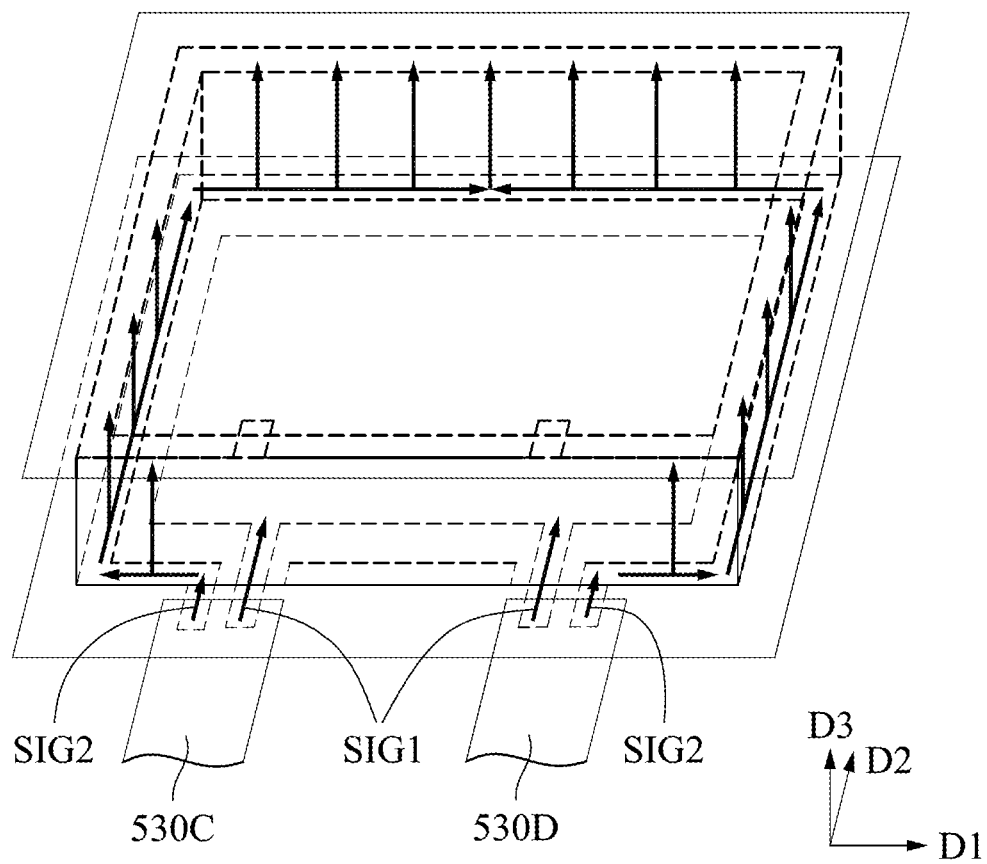
FIG. 11C is a diagram illustrating a perspective view of two circuit boards connecting to two pad groups of the privacy device of FIG. 10.

In the description above, one of two pad groups of the privacy device is coupled to the circuit board, but the disclosure is not limited thereto. In some embodiments, two pad groups of the privacy device are coupled to two circuit boards respectively. FIG. 9C is a schematic diagram illustrating the assembly of the privacy device, the display panel, the circuit board, and the system board in accordance with another embodiment. FIG. 11C is a diagram illustrating a perspective view of two circuit boards connecting to two pad groups of the privacy device of FIG. 10 respectively. Referring to FIG. 9C, for example, the privacy device 110 of the present disclosure is also provided for a client C in addition to the clients A and B as shown in FIGS. 9A and 9B. The client C can assemble the privacy device 110, a display panel 120C, circuit boards 530C, 530D, 540C, and a system board 700C into a privacy display module 140C. The system board 700C includes a circuit region 710C and connection units 720C, 720D and 730C. Multiple integrated circuits and routes (not shown) are disposed in the circuit region 710C. The connection units 720C, 720D, and 730C are coupled to the circuit boards 530C, 530D, and 540C respectively. The circuit boards 540C are coupled to the pads BP3 of the display panel 120C. The circuit boards 530C and 530D are coupled to the pad groups PS-A and PS-B of the privacy device 110 respectively. The circuit boards 530C and 530D are respectively similar to the circuit boards 530A and 530B of FIG. 9A and FIG. 9B. Referring to FIG. 11A and FIG. 11B, when only one of two pad groups of the privacy display apparatus is coupled to the circuit board to receive the first signal SIG1 and the second signal SIG2, the second signal SIG2 is transmitted to one end of the connection electrode 430 that means the approach for transmitting the second signal SIG2 to the connection electrode 430 is one-end driven. FIG. 11C is a diagram illustrating a perspective view of two circuit boards connecting to two pad groups of the privacy device of FIG. 10 respectively. Referring to FIG. 9C, FIG. 10 and FIG. 11C, when two pad groups PS-A and PS-B of the privacy display apparatus are respectively coupled to two circuit boards 530C and 530D to receive the first signal SIG1 and the second signal SIG2, the second signal SIG2 is transmitted to two ends of the connection electrode 430 that means the approach for transmitting the second signal SIG2 to the connection electrode 430 is two-ends driven. Therefore, compared with the one-end driven approach of the connection electrode 430 of FIG. 11A and FIG. 11B, the resistance of the path for transmitting the second signal SIG2 to the privacy electrode 460 of the privacy electrode substrate 400B is further reduced through the two-ends driven approach of the connection electrode 430 of FIG. 11C.

Second Embodiment

Figure 14:
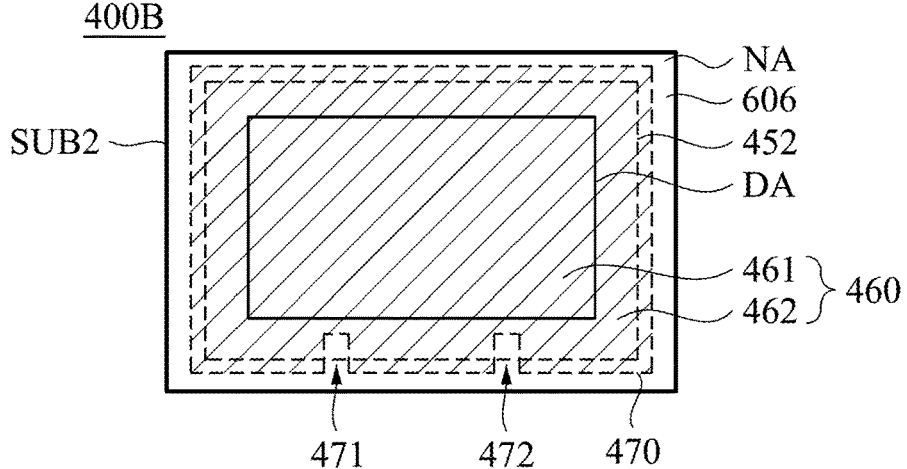
FIG. 14 is a diagram illustrating a top view of the substrates and the sealant in accordance with a second embodiment.
Figure 14:
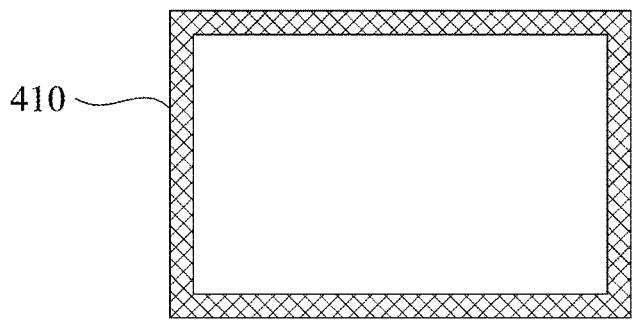
Figure 14:
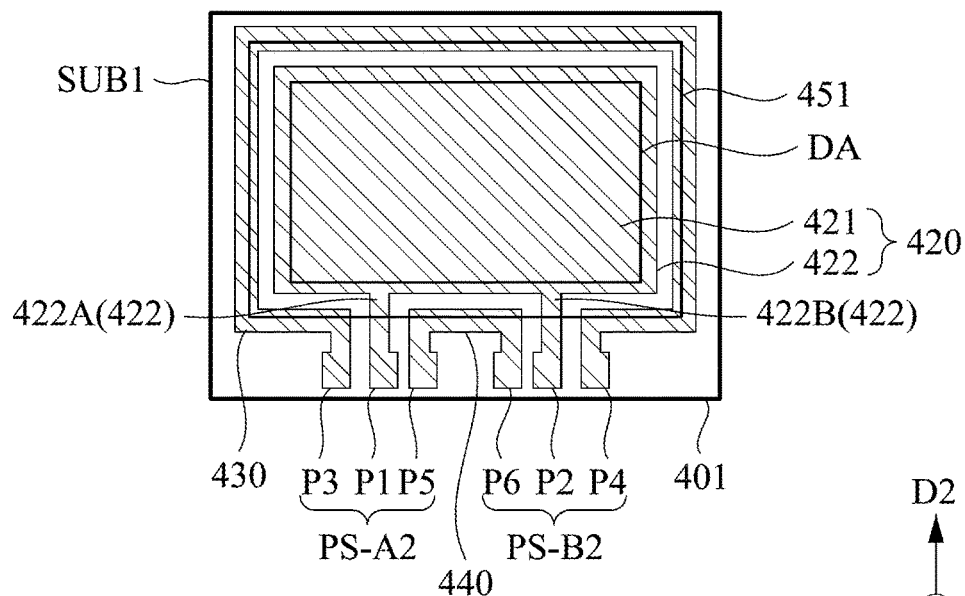
Figure 15:
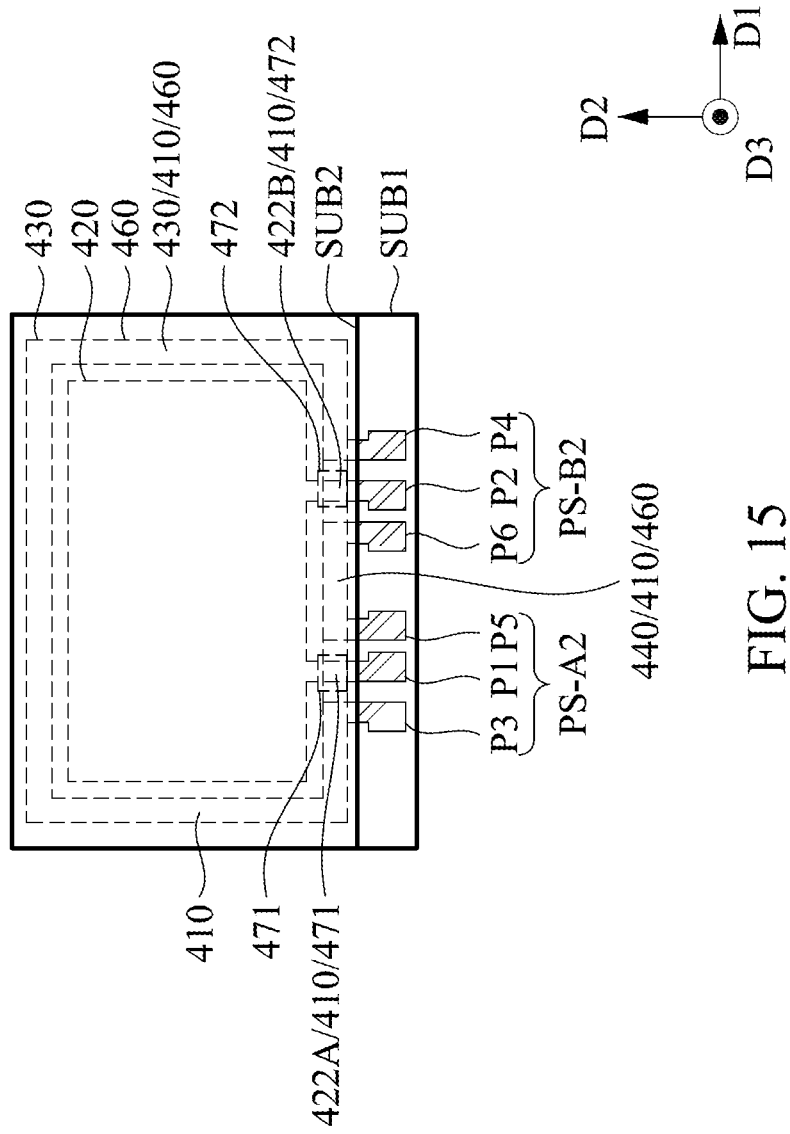
FIG. 15 is a diagram illustrating a top view of the privacy device in accordance with the second embodiment.

FIG. 14 is a diagram illustrating a top view of two privacy electrode substrates and the sealant of the privacy device in accordance with a second embodiment. FIG. 15 is a diagram illustrating a top view of the privacy device after the two privacy electrode substrates are assembled in accordance with the second embodiment. For simplification, the display area DA and the non-display area NA are omitted in FIG. 15. Referring to FIG. 14, the difference between FIG. 14 and FIG. 4 is that a privacy electrode substrate 400A-2 of FIG. 14 further includes a pad P5 and a pad P6 disposed on the substrate SUB1. The pads P5 and P6 are coupled to two ends of the connection electrode 440 respectively. A pad group PS-A2 includes a pad P1, a pad P3, and a pad P5. The pad P1 is disposed between the pad P3 and the pad P5; the pad group PS-B2 includes a pad P2, a pad P4, and a pad P6. The pad P2 is disposed between the pad P4 and the pad P6. Referring to FIG. 15, the pads P1 and P2 are electrically connecting to the privacy electrode 420 of the privacy electrode substrate 400A-2. The pads P3 and P4 are electrically connecting to the privacy electrode 460 of the privacy electrode substrate 400B through the connection electrode 430 and the conductors in the sealant 410. The pads P5 and P6 are electrically connecting to the privacy electrode 460 of the privacy electrode substrate 400B through the connection electrode 440 and the conductors in the sealant 410. Therefore, each of the pad groups PS-A2 and PS-B2 includes a pad electrically connecting to the privacy electrode 420 and two pads electrically connecting to the privacy electrode 460, and the pad electrically connecting to the privacy electrode 420 is disposed between the two pads electrically connecting to the privacy electrode 460. As shown in FIG. 14, the pads P3, P1, P5, P6, P2, and P4 are sequentially arranged between the left edge and the right edge of the substrate SUB1. To be specific, the pads P3, P1, P5, P6, P2, and P4 are sequentially arranged on the substrate SUB1 along a direction from the left edge of the substrate SUB1 to the right edge of the substrate SUB1 (e.g. the direction D1). In the embodiment, the privacy electrode substrate 400A-2 and 400B are referred to as a first privacy electrode substrate and a second privacy electrode substrate respectively. The pads P1, P2, P3, P4, P5, and P6 are respectively referred to as a first pad, a second pad, a third pad, a fourth pad, a fifth pad, and a sixth pad, or referred to as a second pad, a first pad, a fourth pad, a third pad, a sixth pad, and a fifth pad. The remaining part of the privacy electrode substrate 400A-2 of FIG. 14 is similar to the privacy electrode substrate 400A of FIG. 4. The description of the privacy electrode substrate 400B and the sealant 410 of FIG. 14 may be referred to the description of FIG. 4, and therefore it will not be repeated. For simplification, the display area DA, the non-display area NA, the alignment films 451, 452, and the light-shielding layer 606 are omitted in FIG. 15. Referring to FIG. 15, after assembling the privacy electrode substrates 400A-2 and 400B to form the privacy device 110B, the pads P1-P6 are not covered by the privacy electrode substrate 400B in order to be coupled to at least one circuit board.

Figure 16B:
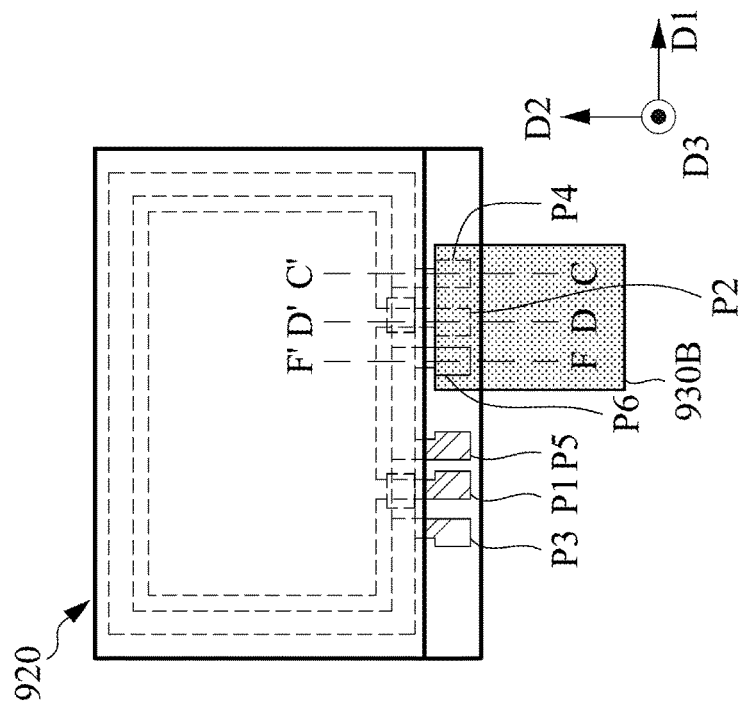
FIG. 16A and FIG. 16B are diagrams illustrating top views of the privacy device of FIG. 15 after it is connected to the circuit board.
Figure 16A:
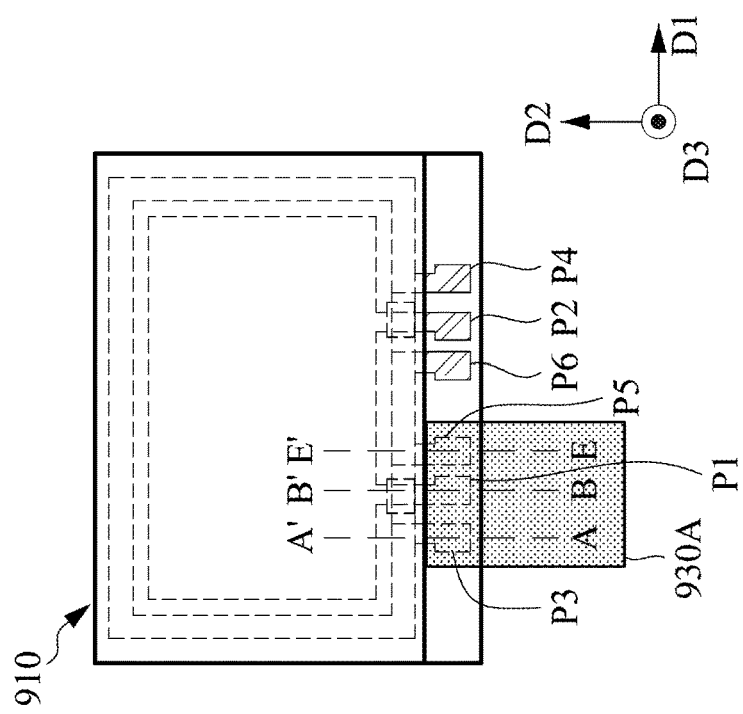

FIG. 16A is a diagram illustrating a top view of the privacy device of FIG. 15 in which one pad group is coupled to a circuit board. FIG. 16B is a diagram illustrating a top view of the privacy device of FIG. 15 in which another pad group is coupled to another circuit board. For simplification, symbol references of the substrates SUB1, SUB2, the sealant 410, the privacy electrodes 420, 460, the connection portions 422A, 422B, the connection electrodes 430, 440, and the concavity portions 471, 472 are omitted in FIG. 16A and FIG. 16B. Referring to FIG. 15 and FIG. 16A, in a situation 910, three pads (not shown) of the circuit board 930A are coupled to the pad group PS-A2 (i.e. coupled to the pads P3, P1, and P5). The circuit board 930A may transmit the first signal SIG1 to the pad P1 and transmit the second signal SIG2 to the pad P3 and the pad P5. Referring to FIG. 15 and FIG. 16B, in a situation 920, three pads (not shown) of the circuit board 930B are coupled to the pad group PS-B2 (i.e. coupled to the pads P6, P2, and P4). The circuit board 930B may transmit the first signal SIG1 to the pad P2 and transmit the second signal SIG2 to the pad P4 and the pad P6. Cross-sectional views along cross-sectional lines AA' and BB' of FIG. 16A are similar to FIG. 7 and FIG. 8 respectively. Cross-sectional views along cross-sectional lines CC' and DD' of FIG. 16B are similar to that along the cross-sectional lines CC' and DD' of FIG. 6B respectively. The differences include that the symbol references of the privacy electrode substrate 400A and the circuit boards 530A and 530B of FIG. 7, FIG. 8 and the cross-sectional views along the cross-sectional lines CC' and DD' of FIG. 6B are replaced with 400A-2, 930A, and 930B respectively to obtain the cross-sectional views along the cross-sectional lines AA' and BB' of FIG. 16A and along the cross-sectional lines CC' and DD' of FIG. 16B, and the remaining part is similar and therefore will not be repeated. In addition, regarding a cross-sectional view along a cross-sectional line EE' of FIG. 16A and a cross-sectional view along a cross-sectional line FF' of FIG. 16B, the cross-sectional view along the cross-sectional line EE' is obtained by replacing the symbol references of the privacy electrode substrate 400A, the pad P1, the connection electrode 430, and the circuit board 530A of FIG. 7 with 400A-2, P5, 440, and 930A respectively, the cross-sectional view along the cross-sectional line FF' is obtained by replacing the symbol references of the privacy electrode substrate 400A, the pad P1, the connection electrode 430, and the circuit board 530A of FIG. 7 with 400A-2, P6, 440, 930B respectively, and the identical description will not be repeated.

Figure 17A:
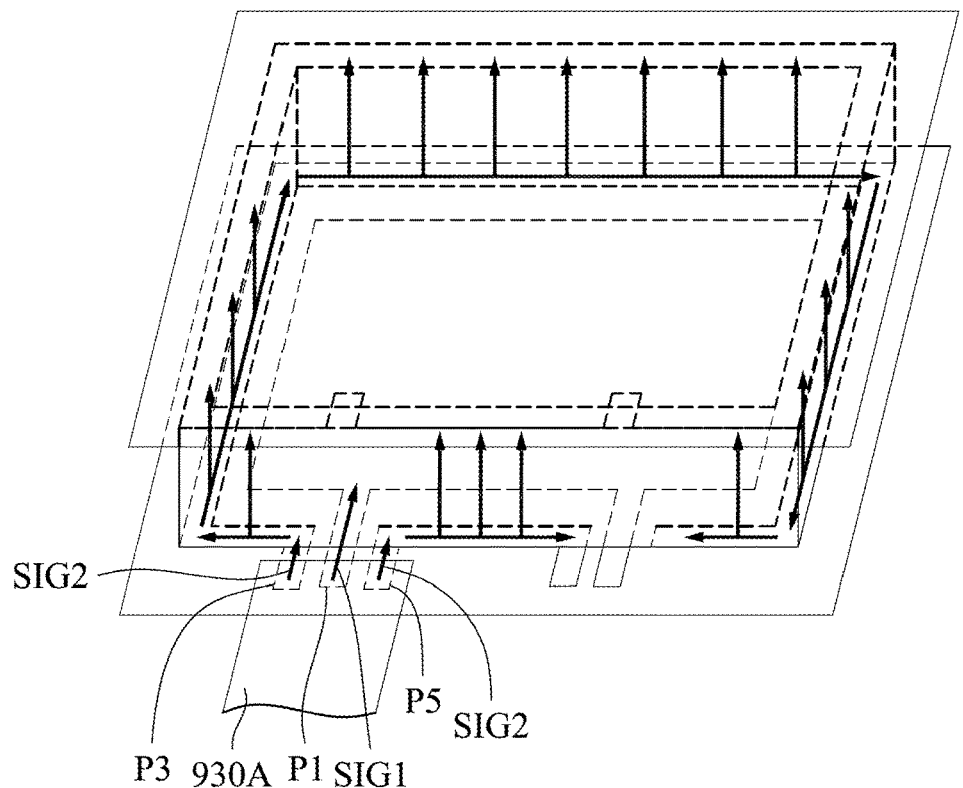
FIG. 17A and FIG. 17B are diagrams illustrating perspective views of the privacy device after it is connected to the circuit board.
Figure 17B:
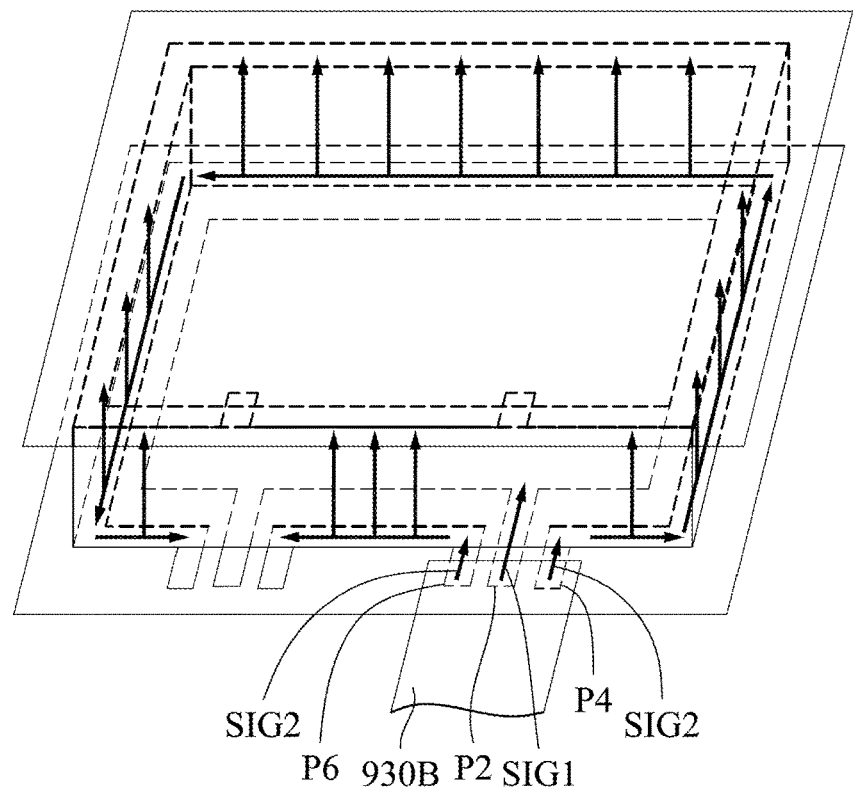

FIG. 17 is a perspective view of FIG. 16A. FIG. 17B is a perspective view of FIG. 16B. Referring to FIGS. 14, 15, 16A, 16B, 17A, and 17B, arrows of FIGS. 17A, 17B represent a path for the circuit board 930A or 930B transmitting the first signal SIG1 to the privacy electrode 420 of the privacy electrode substrate 400A-2 through the pad P1 or P2, and a path for transmitting the second signal SIG2 to the pads P3, P5 or the pads P4, P6 and then to the privacy electrode 460 of the privacy electrode substrate 400B through the connection electrodes 430, 440 of the privacy electrode substrate 400A-2 and the conductors (not shown) in the sealant 410. As shown in FIGS. 14, 15, 17A and 17B, the second signal SIG2 is transmitted to the connection electrode 430 of the privacy electrode substrate 400A-2 through the pad P3 or the pad P4 and then upward to the privacy electrode 460 of the privacy electrode substrate 400B through the conductors in the first portion of the sealant 410 (i.e. the first portion of the conductors of the sealant 410). In addition, the second signal SIG2 is also transmitted to the connection electrode 440 of the privacy electrode substrate 400A-2 through the pad P5 or the pad P6, and then upward to the privacy electrode 460 of the privacy electrode substrate 400B through the conductors in the second portion of the sealant 410 (i.e. the second portion of the conductors of the sealant 410). In other words, the path of the second signal SIG2 transmitted to the privacy electrode 460 includes two sub-paths (i.e. a sub-path in which the second signal SIG2 is transmitted to the privacy electrode 460 through the connection electrode 430 and the conductors in the first portion of the sealant 410 and another sub-path in which the second signal SIG2 is transmitted to the privacy electrode 460 through the connection electrode 440 and the conductors in the second portion of the sealant 410), and thus the resistance of the path for transmitting the second signal SIG2 to the privacy electrode 460 of the privacy electrode substrate 400B is reduced. Referring to FIGS. 11A, 11B, 17A, and 17B, the resistance of the path for transmitting the second signal SIG2 to the privacy electrode 460 of the privacy electrode substrate 400B in FIGS. 17A, 17B is much less than the resistance of the path for transmitting the second signal SIG2 to the privacy electrode 460 of the privacy electrode substrate 400B in FIG. 11A, 11B. Furthermore, an area of border regions of the privacy electrode 460 of the privacy electrode substrate 400B where the second signal SIG2 is transmitted upward to in FIGS. 17A, 17B are larger than an area of border regions of the privacy electrode 460 of the privacy electrode substrate 400B where the second signal SIG2 is transmitted upward to in FIGS. 11A, 11B. Therefore, compared with the embodiments of FIGS. 11A, 11B, the electric potential uniformity of the privacy electrode 460 of the privacy electrode substrate 400B in FIGS. 17A, 17B is increased. Besides, similar to FIG. 11C, the pad group PS-A2 of the privacy device 110B may be coupled to a circuit board, and the pad group PS-B2 is coupled to another circuit board in some embodiments. Accordingly, the second signal SIG2 is transmitted to two ends of the connection electrode 430 and two ends of the connection electrode 440. That is, the approach of transmitting the second signal SIG2 to the connection electrodes 430 and 440 is two-ends driven. Therefore, the resistance of the path for transmitting the second signal SIG2 to the privacy electrode 460 of the privacy electrode substrate 400B is further reduced.

Variant of the First Embodiment

Figure 18:
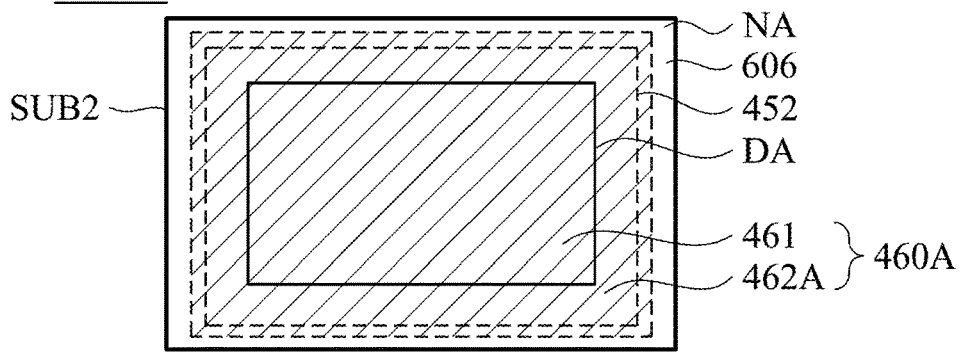
FIG. 18 is a diagram illustrating a top view of the privacy electrode substrates and the sealant in accordance with a variant of the first embodiment.
Figure 18:
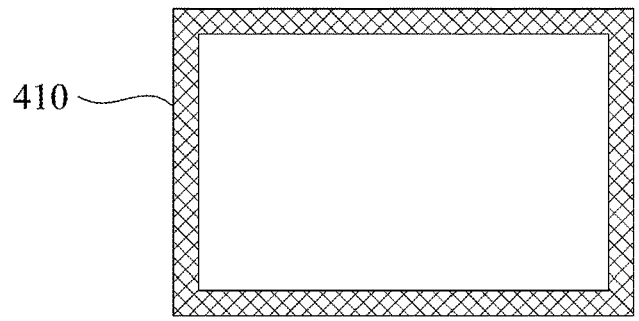
Figure 18:
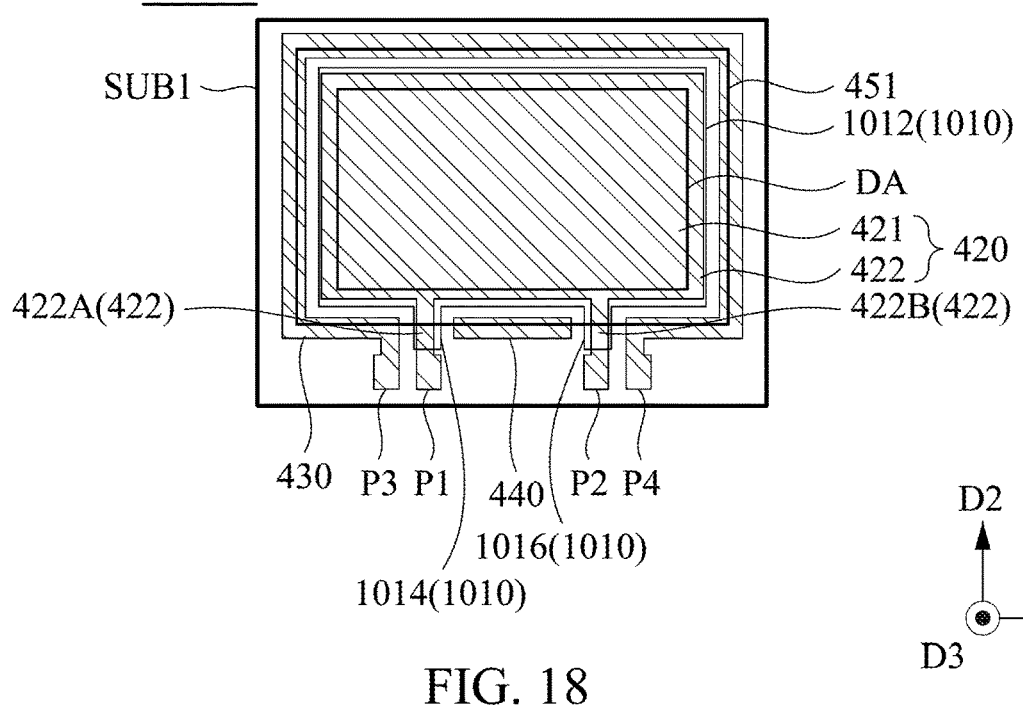
Figure 19:
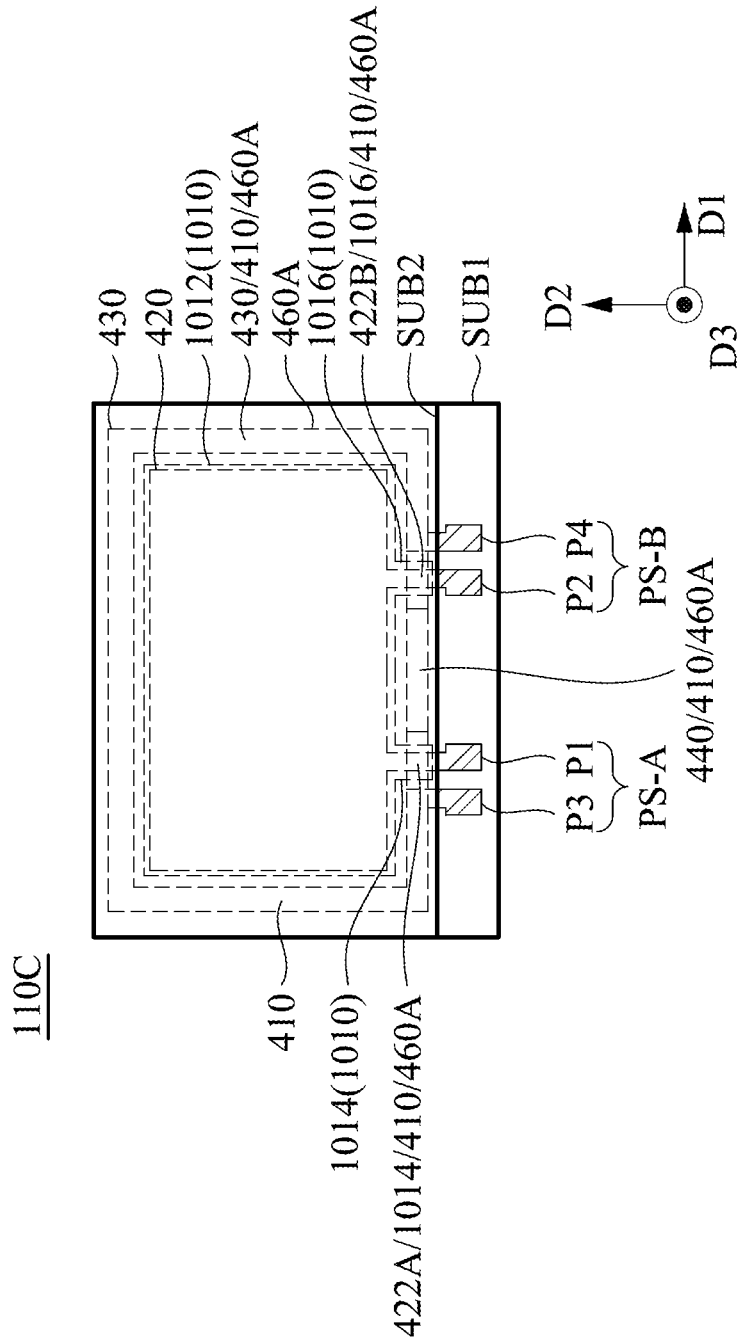
FIG. 19 is a diagram illustrating a top view of the privacy device in accordance with the variant of the first embodiment.

FIG. 18 is a diagram illustrating a top view of two privacy electrode substrates and a sealant of the privacy device in accordance with a variant of the first embodiment. FIG. 19 is a diagram illustrating a top view of the privacy device after assembling two privacy electrode substrates of FIG. 18. For simplification, the display area DA and the non-display area NA are omitted in FIG. 19. Referring to FIGS. 18 and 19, the difference from the first embodiment includes that the privacy electrode substrate 400A-3 further includes an insulation layer 1010 in the variant embodiment, the second portion 462A of the privacy electrode 460A of the privacy electrode substrate 400B-1 does not contain a concavity portion corresponding to the connection portions 422A and 422B of the privacy electrode 420, and the remaining description is similar and therefore will not be repeated. The insulation layer 1010 includes insulation blocks 1012, 1014, and 1016. The insulation block 1012 has two portions which are located in the display area DA and the non-display area NA respectively, and the portion of the insulation block 1012 located in the display area DA is disposed on the privacy electrode 420. The insulation block 1012 covers and protect the first portion 421 of the privacy electrode 420 in the display area DA. The insulation blocks 1014 and 1016 are in the non-display area NA. The insulation blocks 1014 and 1016 are connected to edges of the insulation block 1012. The insulation block 1014 protrudes from an edge of the insulation block 1012 to cover the connection portion 422A of the privacy electrode 420, and the insulation block 1016 protrudes from another edge of the insulation block 1012 to cover the connection portion 422B of the privacy electrode 420. In the embodiment, the insulation block 1014 protrudes in a direction from an edge of the insulation block 1012 toward the pad P1 (i.e. a direction opposite to the direction D2) to cover the connection portion 422A of the privacy electrode 420, and the insulation block 1016 protrudes in a direction from another edge of the insulation block 1012 toward the pad P2 (i.e. a direction opposite to the direction D2) to cover the connection portion 422B of the privacy electrode 420, but the protruding directions of the insulation blocks 1012 and 1014 are not limited thereto. In the embodiment, four portions of the sealant 410 that are respectively overlapped with the connection electrode 430, the connection electrode 440, the connection portion 422A, and the connection portion 422B of the privacy electrode substrate 400A may be respectively referred to as a first potion, a second portion, a third portion, and a fourth portion of the sealant 410 in which the first to fourth portions of the sealant 410 are not overlapped with each other. The insulation block 1014 is overlapped with the connection portion 422A, the third portion of the sealant 411, and a portion of the privacy electrode 460A of the privacy electrode substrate 400B-1 (i.e. a portion of the second portion 462A of the privacy electrode 460A) along the direction D3 as labeled "422A/1014/410/460A" in FIG. 19. The insulation block 1016 is overlapped with the connection portion 422B, the fourth portion of the sealant 411, and another portion of the privacy electrode 460A of the privacy electrode substrate 400B-1 (i.e. another potion of the second portion 462A of the privacy electrode 460A) along the direction D3 as labeled "422B/1016/410/460A" in FIG. 19. The insulation block 1014 is disposed between the connection portion 422A and the third portion of the sealant 411, and the insulation block 1016 is disposed between the connection portion 422B and the fourth portion of the sealant 411, therefore, the insulation blocks 1014 and 1016 can prevent the connection portions 422A and 422B from contacting the sealant 410 that will be described in detail in FIGS. 21 and 22. In the embodiment, the privacy electrode substrates 400A-3 and 400B-1 may be referred to as a first privacy electrode substrate and a second privacy electrode substrate respectively. The privacy electrodes 420 and 460A may be referred to as a first privacy electrode and a second privacy electrode respectively. The insulation blocks 1014, 1016 and the connection portion 422A and 422B may be referred to as a first insulation block, a second insulation block, a first connection portion and a second connection portion respectively or the second insulation block, the first insulation block, the second connection portion and the first connection portion respectively.

Figure 20B:
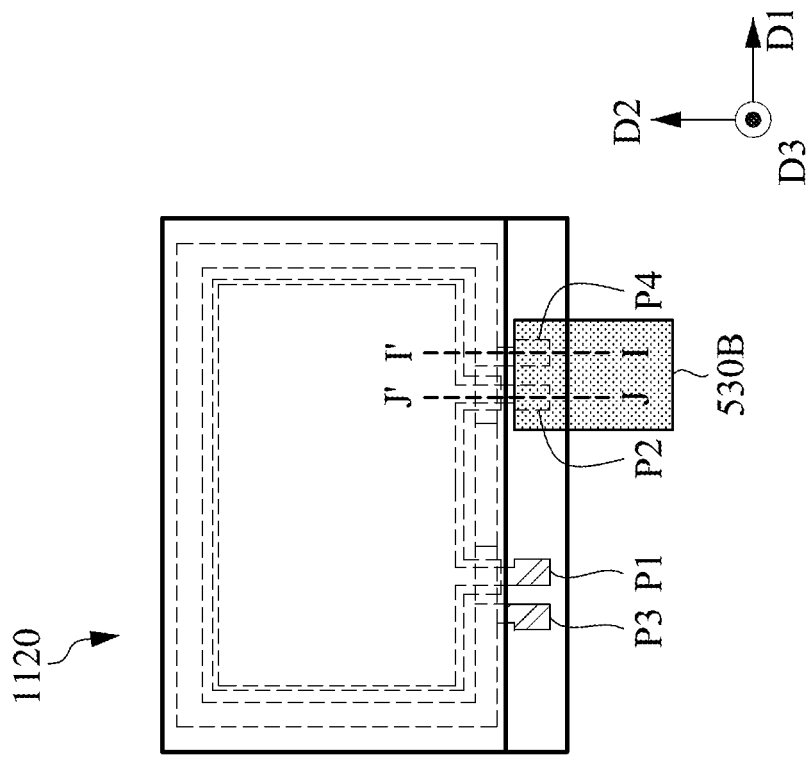
FIG. 20A and FIG. 20B are diagrams illustrating top views of the privacy device of FIG. 19 after it is connected to the circuit board.
Figure 20A:
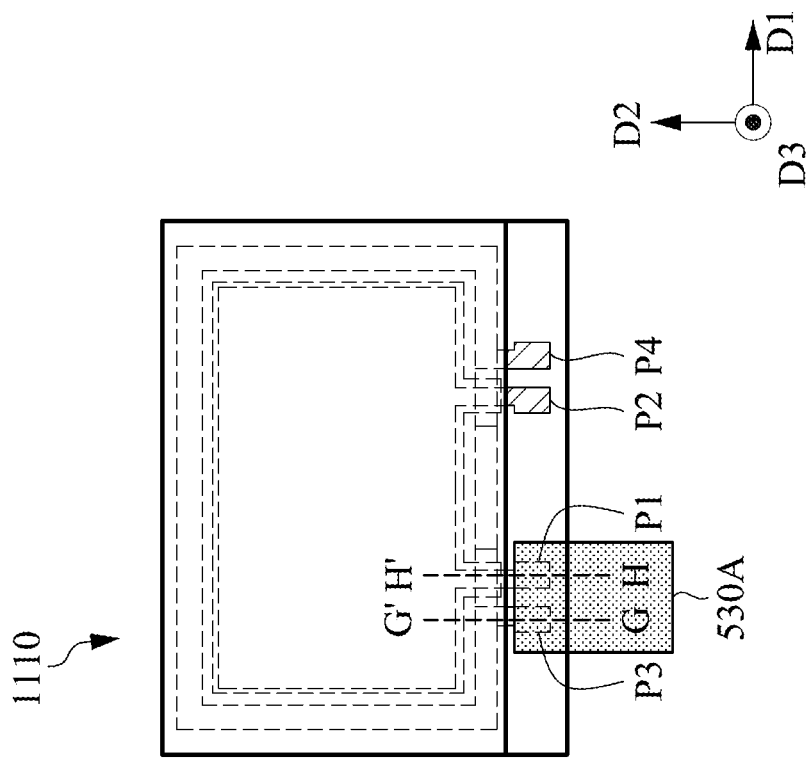
Figure 21:
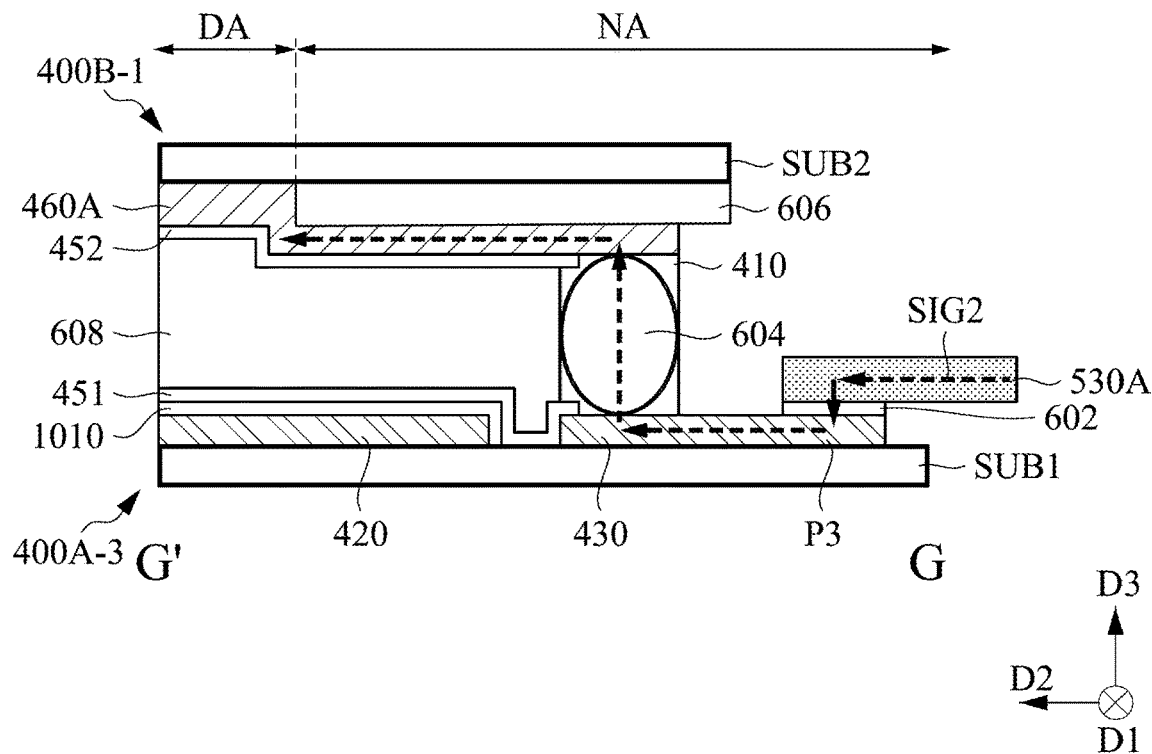
FIG. 21 is a diagram illustrating a cross-sectional view along a cross-sectional line GG' of FIG. 20A.
Figure 22:
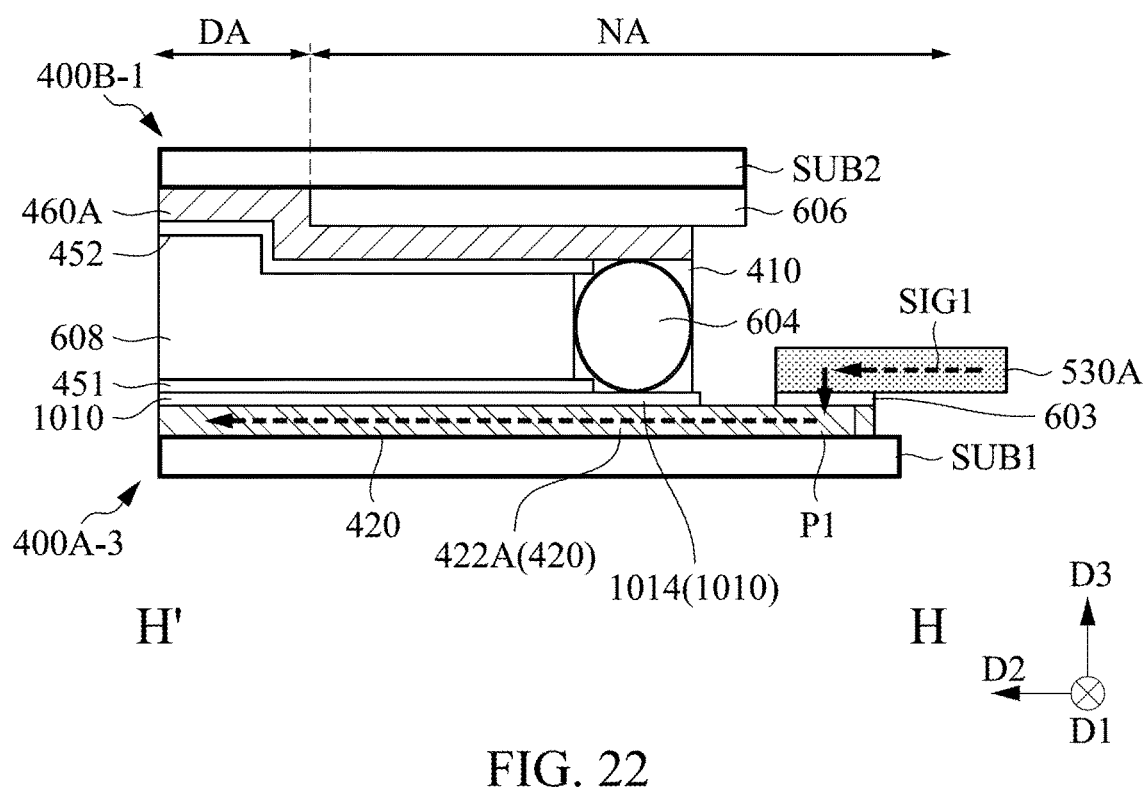
FIG. 22 is a diagram illustrating a cross-sectional view along a cross-sectional line HH' of FIG. 20A.

FIG. 20A is a diagram illustrating a top view after a pad group of the privacy device of FIG. 19 is coupled to a circuit board. FIG. 20B is a diagram illustrating a top view after another pad group of the privacy device of FIG. 19 is coupled to another circuit board. FIG. 21 is a diagram illustrating a cross-sectional view along a cross-sectional line GG' of FIG. 20A. FIG. 22 is a diagram illustrating a cross-sectional view along a cross-sectional line HH' of FIG. 20A. For simplification, symbol references of the substrates SUB1, SUB2, the sealant 410, the privacy electrodes 420, 460A, the connection portions 422A, 422B, the connection electrodes 430, 440, and the insulation layer 1010 are omitted in FIG. 20A and FIG. 20B. Referring to FIGS. 18, 19, 20A, 21, and 22, in a situation 1110, a circuit board 530A is connected to the pads P1 and P3 of the pad group PS-A. As shown in FIG. 22, the circuit board 530A transmits the first signal SIG1 to the pad P1, and then to the privacy electrode 420 of the privacy electrode substrate 400A-3. As shown in FIG. 21, the circuit board 530A transmits the second signal SIG2 to the pad P3, and then to the privacy electrode 460A of the privacy electrode substrate 400B-1 through the connection electrode 430 and the conductor 604 of the sealant 410. In particular, in FIG. 22, a portion of the sealant 410 is overlapped with the connection portion 422A of the privacy electrode 420, the insulation block 1014 of the insulation layer 1010, and a portion of the privacy electrode 460A along the direction D3 that corresponds to the label "422A/1014/410/460A" of FIG. 19. The insulation block 1014 of the insulation layer 1010 is disposed between the connection portion 422A of the privacy electrode 420 and the sealant 410, and thus the conductor 604 in the portion of the sealant 410 does not contact the connection portion 422A of the privacy electrode 420. Accordingly, the privacy electrode 420 is not electrically connected to the privacy electrode 460A. The first signal SIG1 will not be transmitted to the privacy electrode 460A to avoid the short circuit between the privacy electrodes 420 and 460A.

Referring to FIG. 20B, in a situation 1120, two pads (not shown) of the circuit board 530B are electrically connecting to the pads P2 and P4 of the pad group PS-B respectively. Regarding cross-sectional views along cross-sectional lines II' and JJ' of FIG. 20B, the cross-sectional view along the cross-sectional lines II' is obtained by replacing the symbols of the pad P3 and the circuit board 530A of FIG. 21 with the pad P4 and the circuit board 530B respectively, the cross-sectional view along the cross-sectional lines JJ' is obtained by replacing the symbols of the pad P1, the circuit board 530A, the connection portion 422A, and the insulation block 1014 of FIG. 22 with the pad P2, the circuit board 530B, the connection portion 422B, and the insulation block 1016 respectively, and the description of identical parts will not be repeated. Similar to FIG. 20A, 21, and 22, a portion of the sealant 410 is overlapped with the connection portion 422B of the privacy electrode 420, the insulation block 1016 of the insulation layer 1010, and the privacy electrode 460A along the direction D3 as labeled "422B/1016/410/460A" in FIG. 19. Therefore, the conductor 604 in the portion of the sealant 410 does not contact the connection portion 422B of the privacy electrode 420, and the privacy electrode 420 is not electrically connecting to the privacy electrode 460A. Accordingly, the first signal SIG1 is not transmitted to the privacy electrode 460A to avoid the short circuit between the privacy electrodes 420 and 460A. The circuit board 530B transmits the first signal SIG1 to the pad P2, and then to the privacy electrode 420 of the privacy electrode substrate 400A-3. The circuit board 530B transmits the second signal SIG2 to the pad P4, and then to the connection electrode 430 of the privacy electrode substrate 400A-3, and then to the privacy electrode 460A of the privacy electrode substrate 400B-1 through the conductor 604 of the sealant 410. In addition, the insulation layer 1010 may only include the insulation blocks 1014 and 1016 but not include the insulation block 1012 in some embodiments, and this embodiment can also prevent the short circuit between the privacy electrodes 420 and 460A.

Note that the concept of the variant embodiment may be applied to the second embodiment to form a variant of the second embodiment. For example, in the variant of the second embodiment, the privacy electrode substrate of FIG. 14 may include an insulation layer covering the connection portions 422A and 422B of the privacy electrode 420, and the privacy electrode 460 of the privacy electrode substrate 400B does not contain concavity portions corresponding to the connection portions 422A and 422B of the privacy electrode 420. The description of identical parts will not be repeated.

Although the present invention has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A privacy device having a display area and a non-display area, wherein the privacy device comprises:
   a first substrate;
   a first privacy electrode disposed on the first substrate, wherein a first portion of the first privacy electrode is in the display area, and a second portion of the first privacy electrode is in the non-display area;
   a first pad and a second pad disposed on the first substrate, wherein the first pad and the second pad are in the non-display area and coupled to the first privacy electrode;
   a first connection electrode disposed on the first substrate and in the non-display area, wherein the first connection electrode is electrically insulated from the first privacy electrode;
   a third pad and a fourth pad disposed on the first substrate, wherein the third pad and the fourth pad are in the non-display area and coupled to the first connection electrode, and the first pad and the second pad are disposed between the third pad and the fourth pad;
   a second substrate;
   a liquid-crystal layer disposed between the first substrate and the second substrate;
   a second privacy electrode disposed on a surface of the second substrate facing the liquid-crystal layer, wherein a first portion of the second privacy electrode is in the display area, and a second portion of the second privacy electrode is in the non-display area; and
   a sealant disposed between the first substrate and the second substrate, wherein the sealant comprises a plurality of conductors, and the first connection electrode, the sealant, and the second portion of the second privacy electrode overlap with each other along a direction perpendicular to a top surface of the first substrate.

2. The privacy device of claim 1, wherein the first connection electrode is overlapped with a first portion of the sealant along the direction perpendicular to the top surface of the first substrate, the first portion of the sealant comprises a first portion of the conductors, and the first connection electrode is electrically connected to the second privacy electrode through the first portion of the conductors.

3. The privacy device of claim 1, wherein each of the conductors is a conductive particle.

4. The privacy device of claim 1, wherein the first connection electrode is disposed between an edge of the first substrate and the first privacy electrode, the first connection electrode surrounds a portion of a perimeter of the first privacy electrode, and two ends of the first connection electrode are coupled to the third pad and the fourth pad respectively.

5. The privacy device of claim 4, wherein the first connection electrode at least surrounds an upper edge, a left edge and a right edge of the first privacy electrode.

6. The privacy device of claim 5, wherein the first connection electrode further surrounds a portion of a bottom edge of the first privacy electrode.

7. The privacy device of claim 1, wherein the third pad, the first pad, the second pad and the fourth pad are sequentially arranged along a direction.

8. The privacy device of claim 1, further comprising a second connection electrode, a fifth pad, and a sixth pad disposed on the first substrate and in the non-display area, wherein the fifth pad and the sixth pad are coupled to the second connection electrode and located between the first pad and the second pad.

9. The privacy device of claim 8, wherein the second connection electrode, the sealant, and the second portion of the second privacy electrode overlap with each other along the direction perpendicular to the top surface of the first substrate.

10. The privacy device of claim 9, wherein the second connection electrode is overlapped with a second portion of the sealant along the direction perpendicular to the top surface of the first substrate, the second portion of the sealant comprises a second portion of the conductors, and the second connection electrode is electrically connected to the second privacy electrode through the second portion of the conductors.

11. The privacy device of claim 8, wherein the second connection electrode is located between an edge of the first substrate and the first privacy electrode, and two ends of the second connection electrode are coupled to the fifth pad and the sixth pad respectively.

12. The privacy device of claim 8, wherein the third pad, the first pad, the fifth pad, the sixth pad, the second pad and the fourth pad are sequentially arranged along a direction.

13. The privacy device of claim 1, wherein the second portion of the first privacy electrode comprises a first connection portion and a second connection portion that are electrically connected to the first pad and the second pad respectively, and the second portion of the second privacy electrode has a first concavity portion and a second concavity portion,
   wherein the first concavity portion, a third portion of the sealant, and the first connection portion overlap with each other along the direction perpendicular to the top surface of the first substrate, and the second concavity portion, a fourth portion of the sealant, and the second connection portion overlap with each other along the direction perpendicular to the top surface of the first substrate.

14. The privacy device of claim 1, further comprising an insulation layer disposed on the first substrate,
   wherein the second portion of the first privacy electrode, the insulation layer, the sealant, and the second portion of the second privacy electrode overlap with each other along the direction perpendicular to the top surface of the first substrate.

15. The privacy device of claim 14, wherein the insulation layer comprises a first insulation block and a second insulation block, the second portion of the first privacy electrode comprises a first connection portion and a second connection portion that are electrically connected to the first pad and the second pad respectively, the first insulation block is disposed between the first connection portion and a third portion of the sealant along the direction perpendicular to the top surface of the first substrate, and the second insulation block is disposed between the second connection portion and a fourth portion of the sealant along the direction perpendicular to the top surface of the first substrate.

16. A privacy display apparatus having a display area and a non-display area, wherein the privacy display apparatus comprises:
   a display panel; and
   a privacy device disposed at a side of the display panel, wherein the privacy device comprises:
      a first substrate;
      a first privacy electrode disposed on the first substrate, wherein a first portion of the first privacy electrode is in the display area, and a second portion of the first privacy electrode is in the non-display area;

a first pad and a second pad disposed on the first substrate, wherein the first pad and the second pad are in the non-display area and coupled to the first privacy electrode;

a first connection electrode disposed on the first substrate and in the non-display area, wherein the first connection electrode is electrically insulated from the first privacy electrode;

a third pad and a fourth pad disposed on the first substrate, wherein the third pad and the fourth pad are in the non-display area and coupled to the first connection electrode, and the first pad and the second pad are disposed between the third pad and the fourth pad;

a second substrate;

a liquid-crystal layer disposed between the first substrate and the second substrate;

a second privacy electrode disposed on a surface of the second substrate facing the liquid-crystal layer, wherein a first portion of the second privacy electrode is in the display area, and a second portion of the second privacy electrode is in the non-display area; and a sealant disposed between the first substrate and the second substrate, wherein the sealant comprises a plurality of conductors, and the first connection electrode, the sealant, and the second portion of the second privacy electrode overlap with each other along a direction perpendicular to a top surface of the first substrate.

17. The privacy display apparatus of claim 16, the privacy device is disposed at a light-incident side or a light-emitting side of the display panel.

18. The privacy display apparatus of claim 16, further comprising a circuit board electrically connected to the first pad and the third pad, wherein the circuit board is configured to transmit a first signal and a second signal to the first pad and the third pad respectively.

19. The privacy display apparatus of claim 18, further comprising another circuit board electrically connected to the second pad and the fourth pad, wherein the another circuit board is configured to transmit the first signal and the second signal to the second pad and the fourth pad respectively.

20. The privacy display apparatus of claim 18, wherein the privacy device further comprises a second connection electrode, a fifth pad, and a sixth pad disposed on the first substrate and in the non-display area, wherein the fifth pad and the sixth pad are coupled to the second connection electrode and located between the first pad and the second pad, wherein the circuit board is electrically connected to the fifth pad, wherein the circuit board is configured to transmit the second signal to the fifth pad.

* * * * *